Aug. 3, 1954      E. H. THOMPSON      2,685,393
SELECTIVE BEVERAGE VENDING MACHINE

Filed April 26, 1947      23 Sheets—Sheet 1

INVENTOR.
Ernest H Thompson
By: Spencer, Marzall, Johnston & Cook. Attys

Aug. 3, 1954     E. H. THOMPSON     2,685,393
SELECTIVE BEVERAGE VENDING MACHINE
Filed April 26, 1947     23 Sheets-Sheet 4

Inventor
Ernest H. Thompson
By Spencer, Marzall, Johnston & Cook
Attys

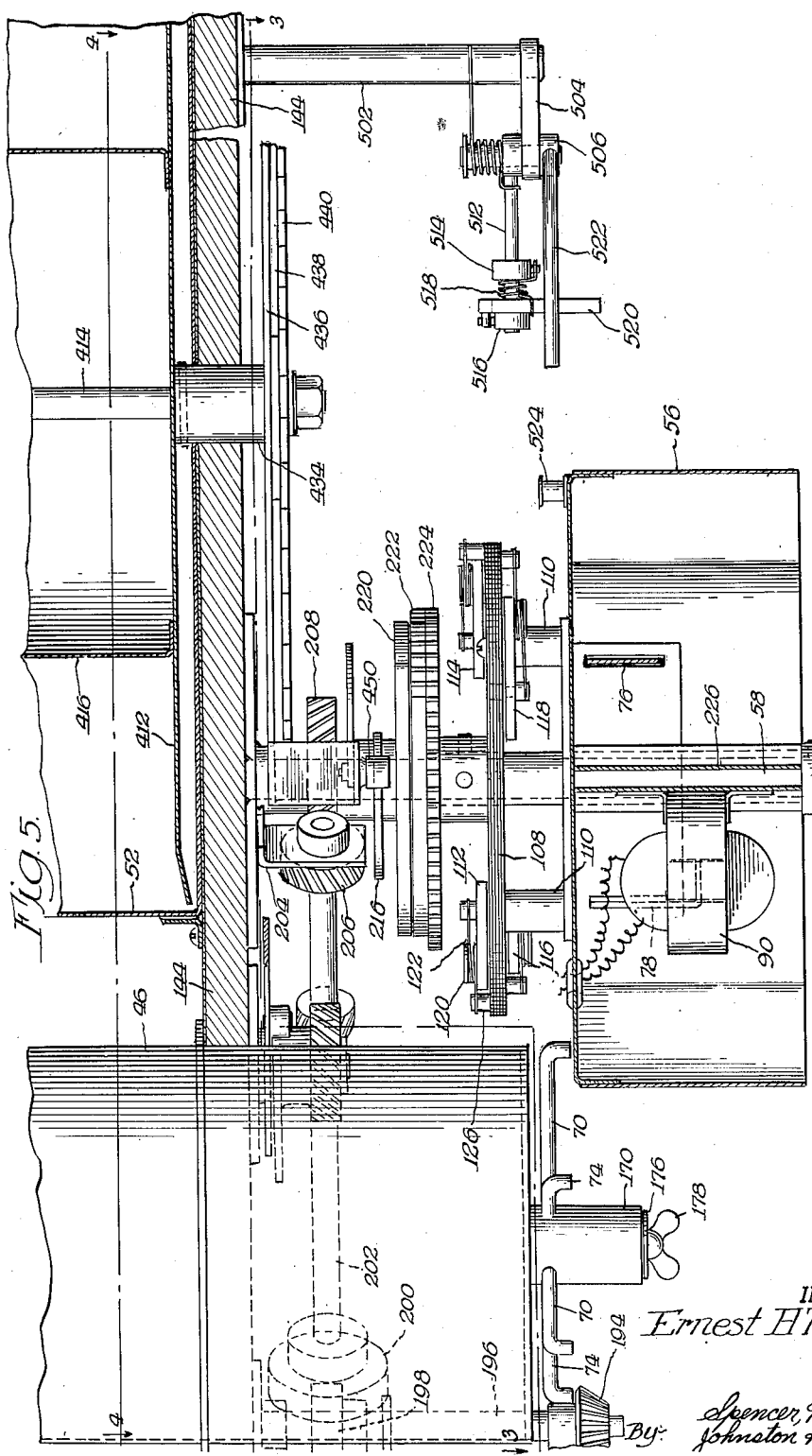

Aug. 3, 1954 E. H. THOMPSON 2,685,393
SELECTIVE BEVERAGE VENDING MACHINE
Filed April 26, 1947 23 Sheets-Sheet 6
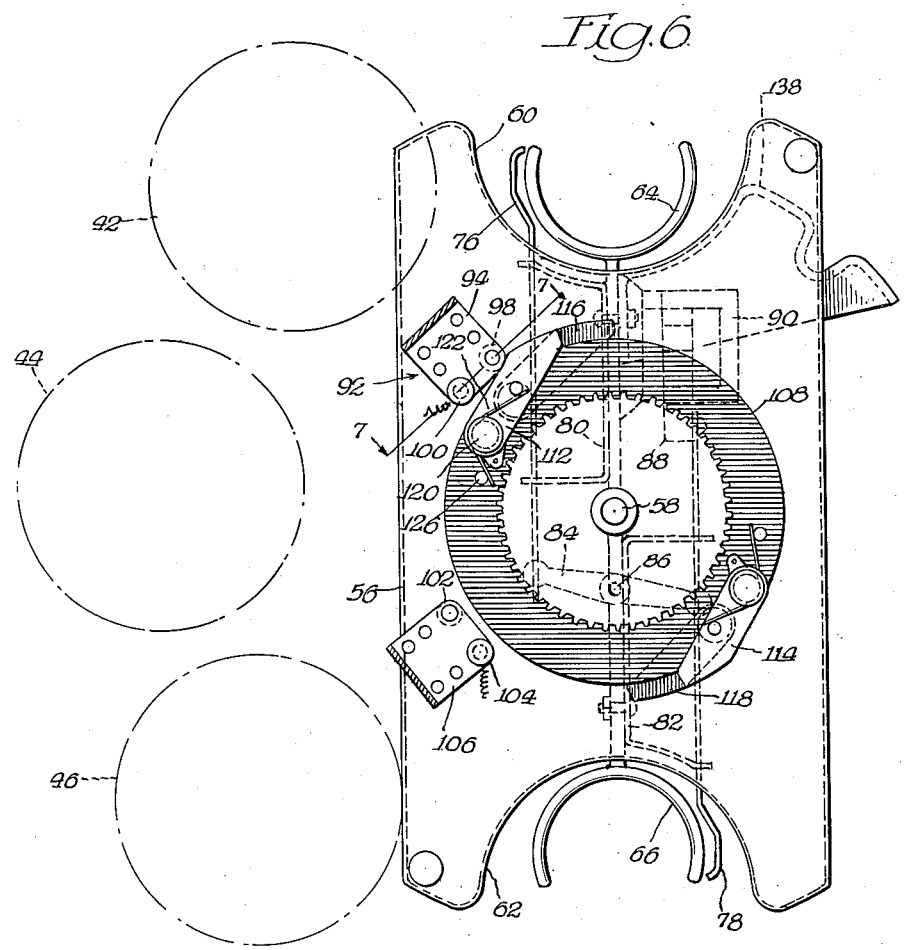
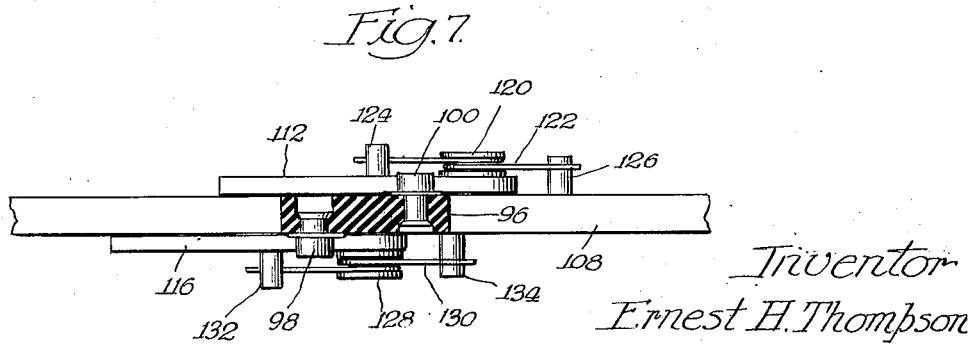
Inventor
Ernest H. Thompson
By Spencer, Marzall, Johnston & Cook Att'ys

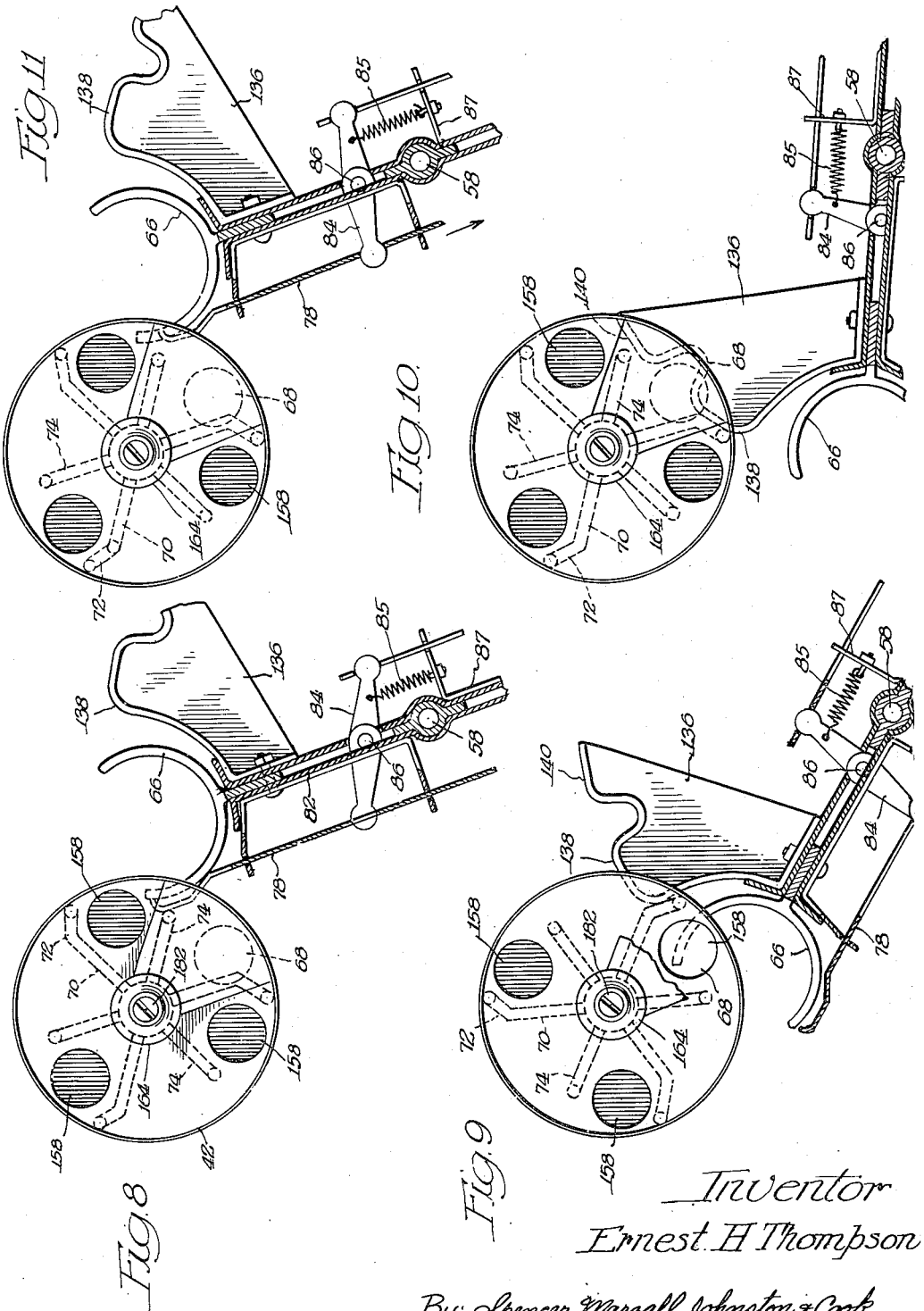

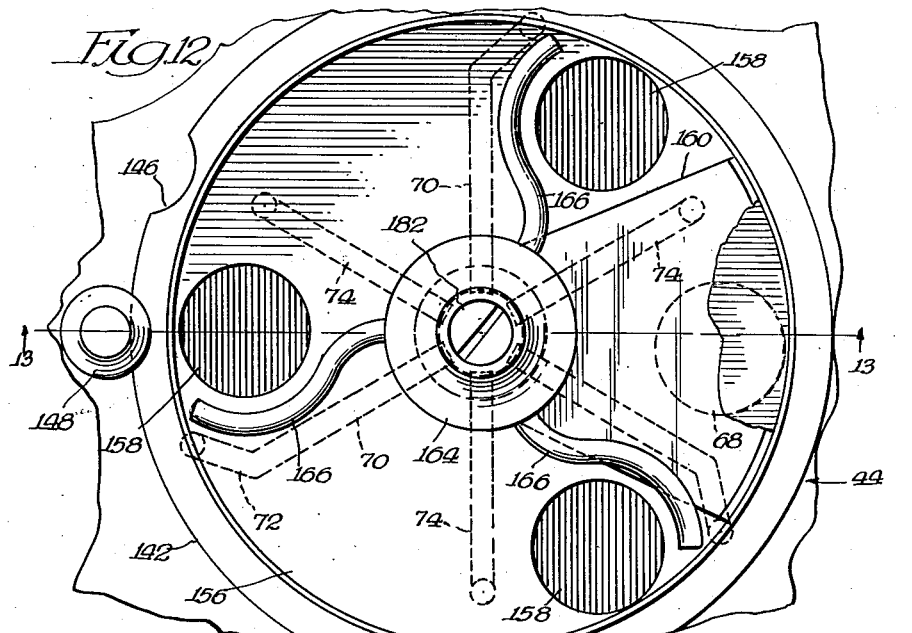

Aug. 3, 1954
E. H. THOMPSON
2,685,393
SELECTIVE BEVERAGE VENDING MACHINE
Filed April 26, 1947
23 Sheets-Sheet 9
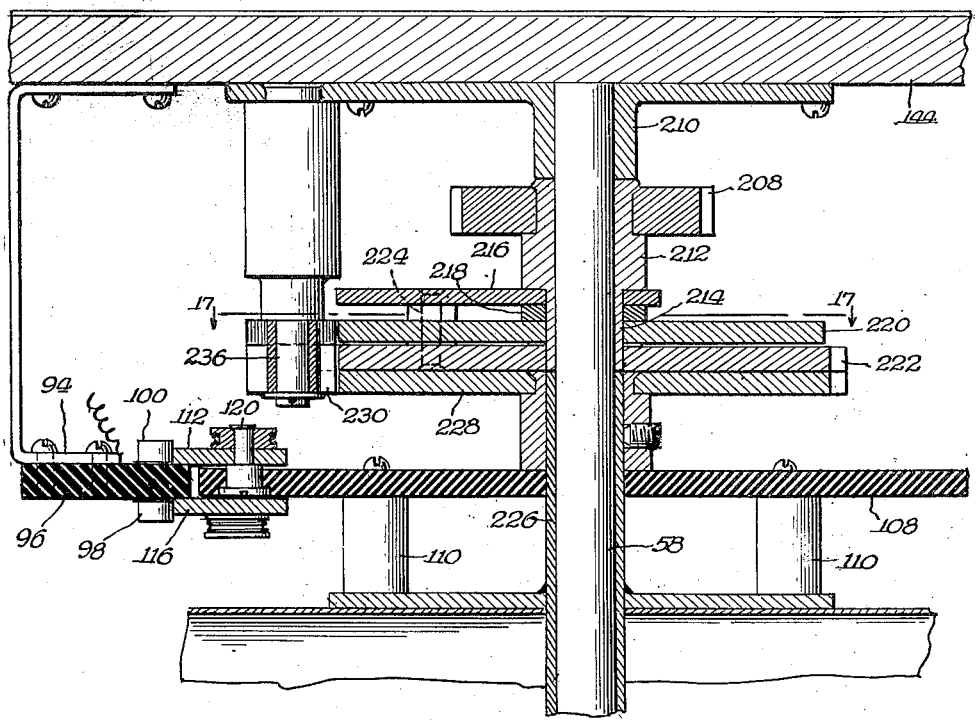
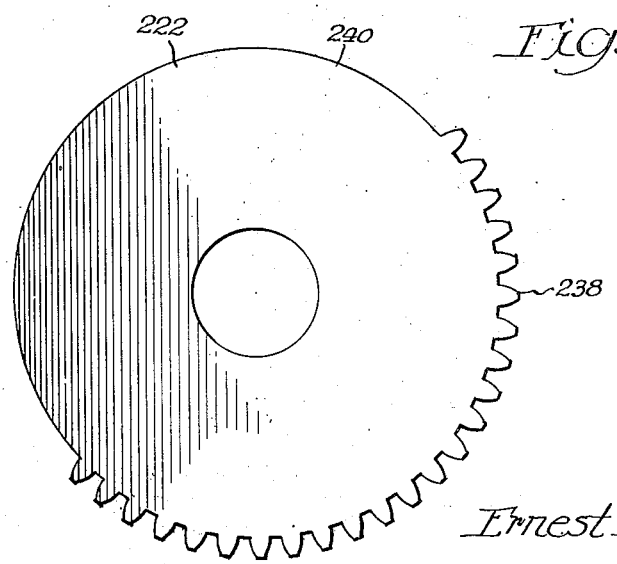
INVENTOR.
*Ernest H Thompson*
By: *Spencer, Marzall, Johnston & Cook.* Attys Aug. 3, 1954   E. H. THOMPSON   2,685,393
SELECTIVE BEVERAGE VENDING MACHINE
Filed April 26, 1947   23 Sheets-Sheet 10
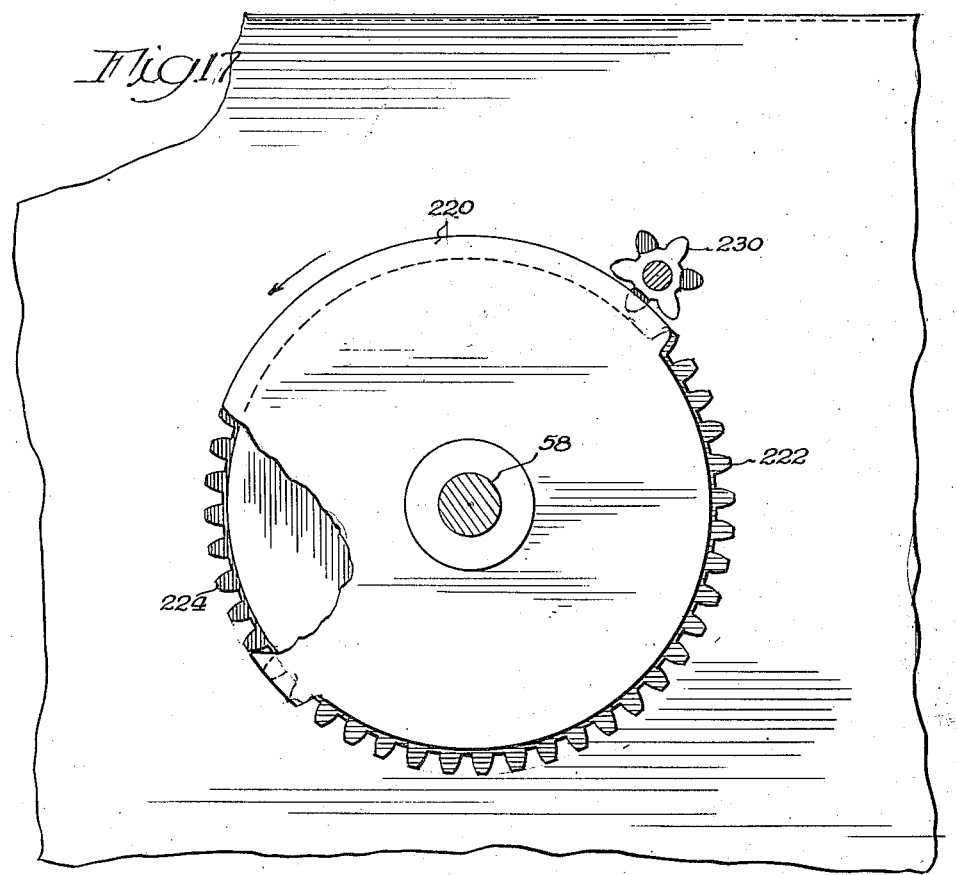
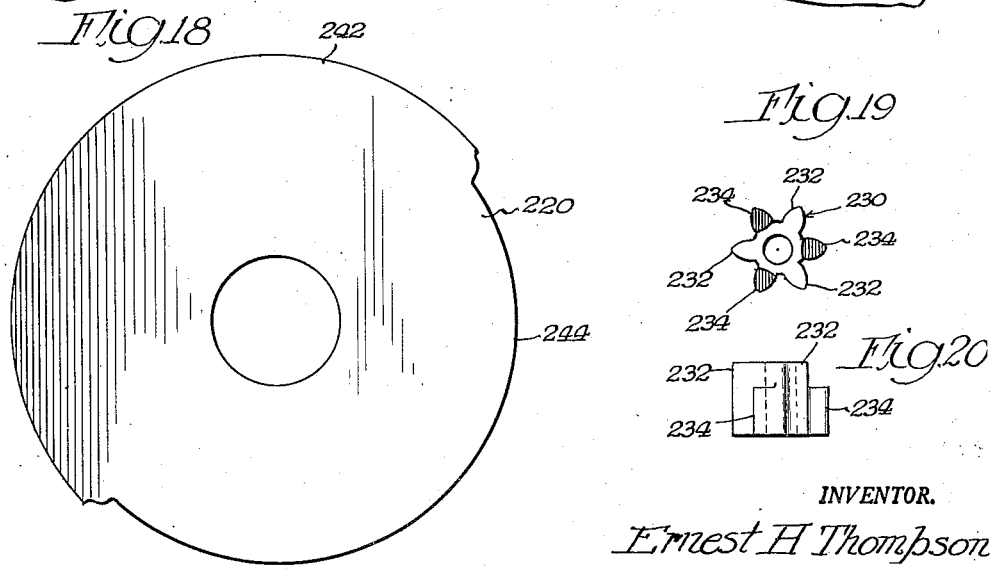
INVENTOR.
Ernest H Thompson
By: Spencer, Margall Johnston & Cook Attys

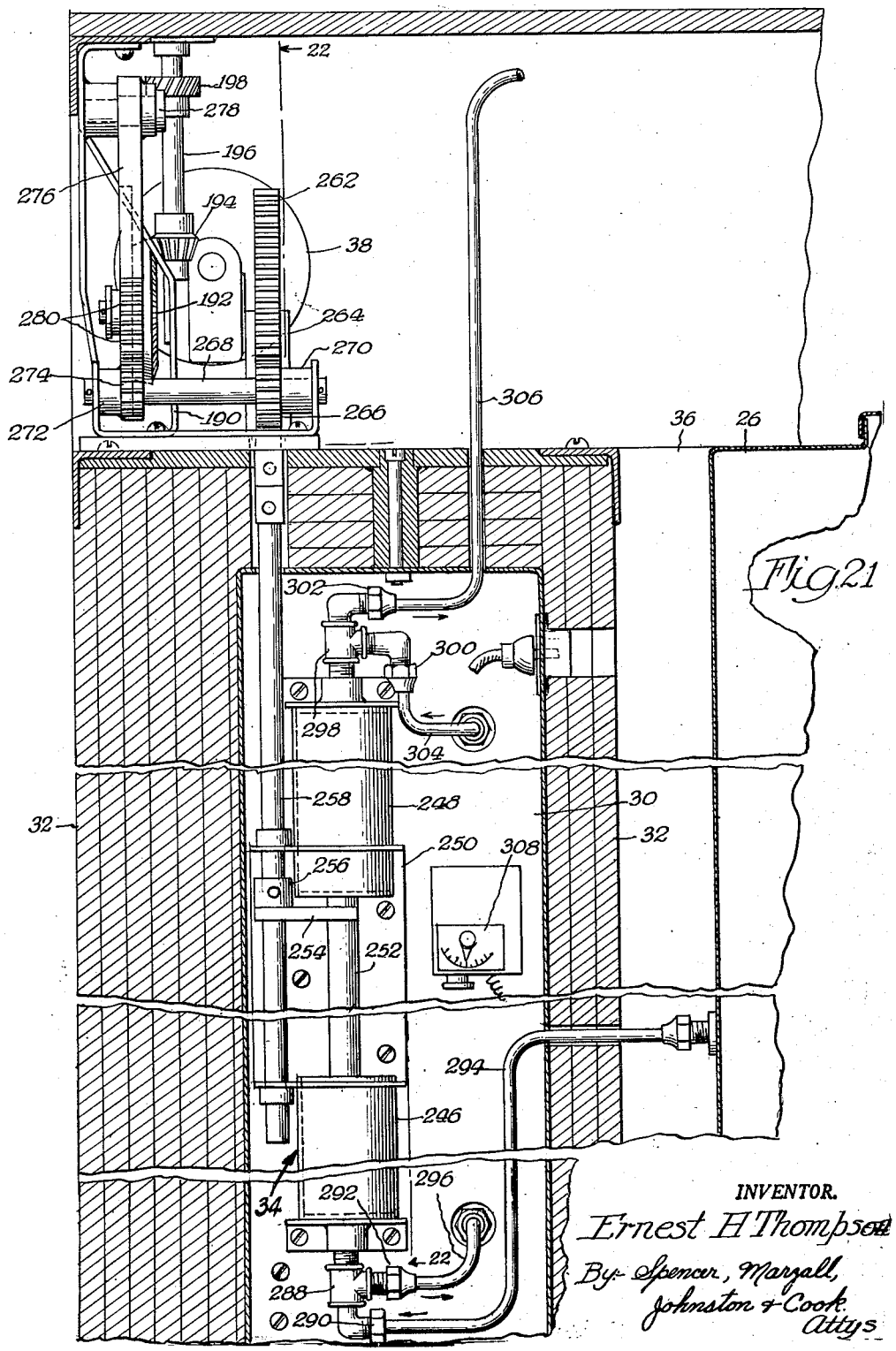

Aug. 3, 1954  E. H. THOMPSON  2,685,393
SELECTIVE BEVERAGE VENDING MACHINE
Filed April 26, 1947  23 Sheets-Sheet 12
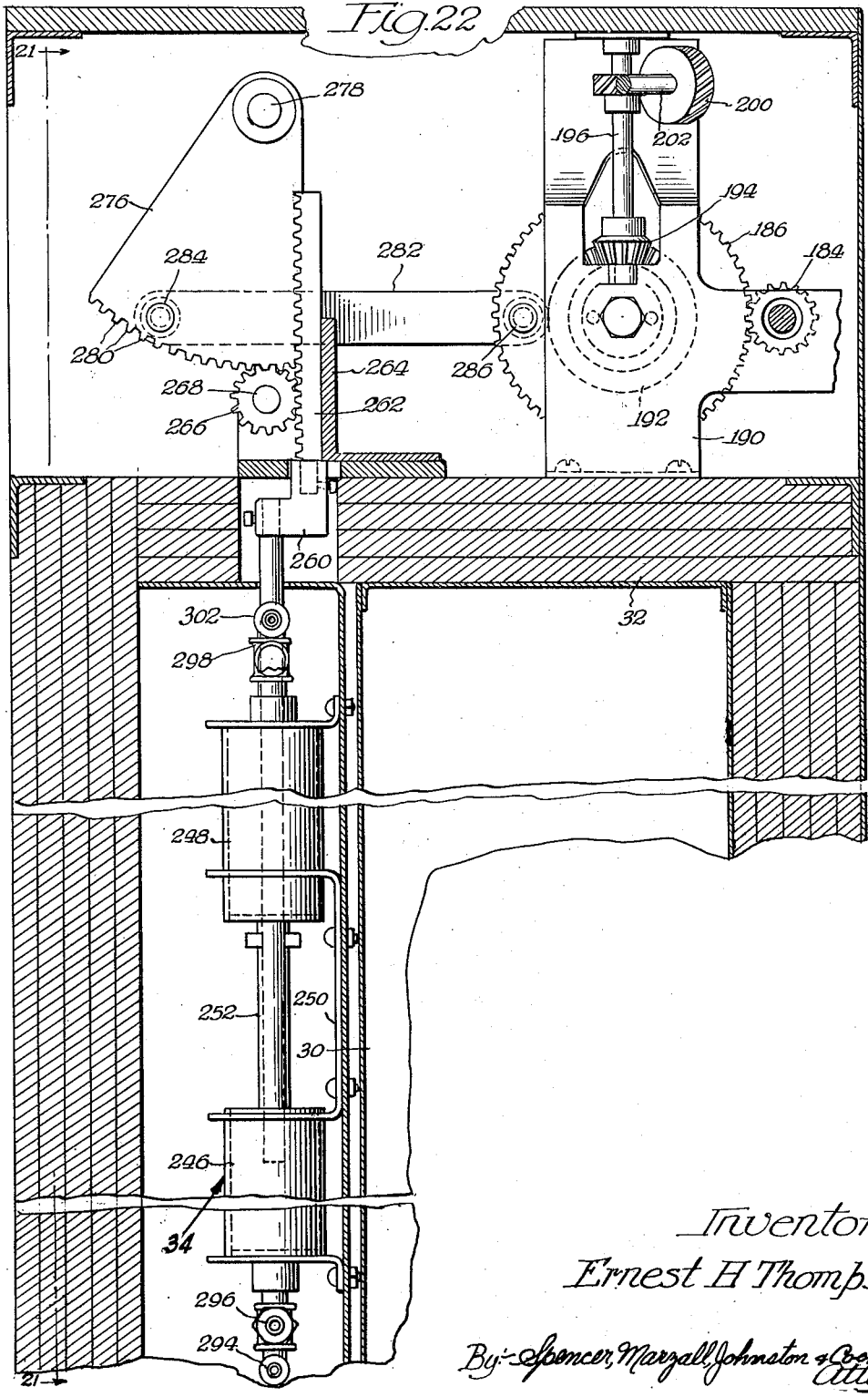
Inventor
Ernest H Thompson
By Spencer, Marzall, Johnston & Cook
Atty's

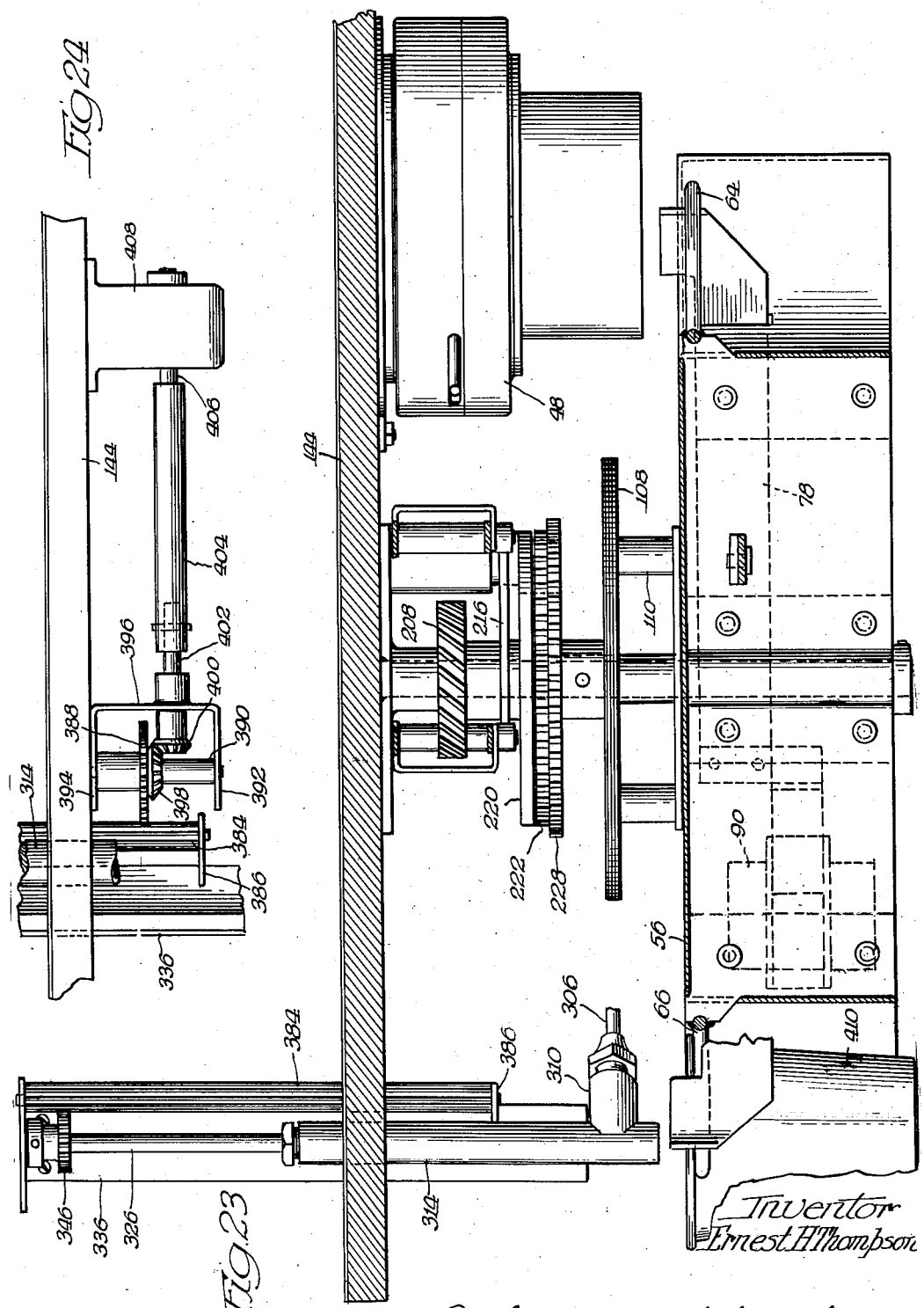

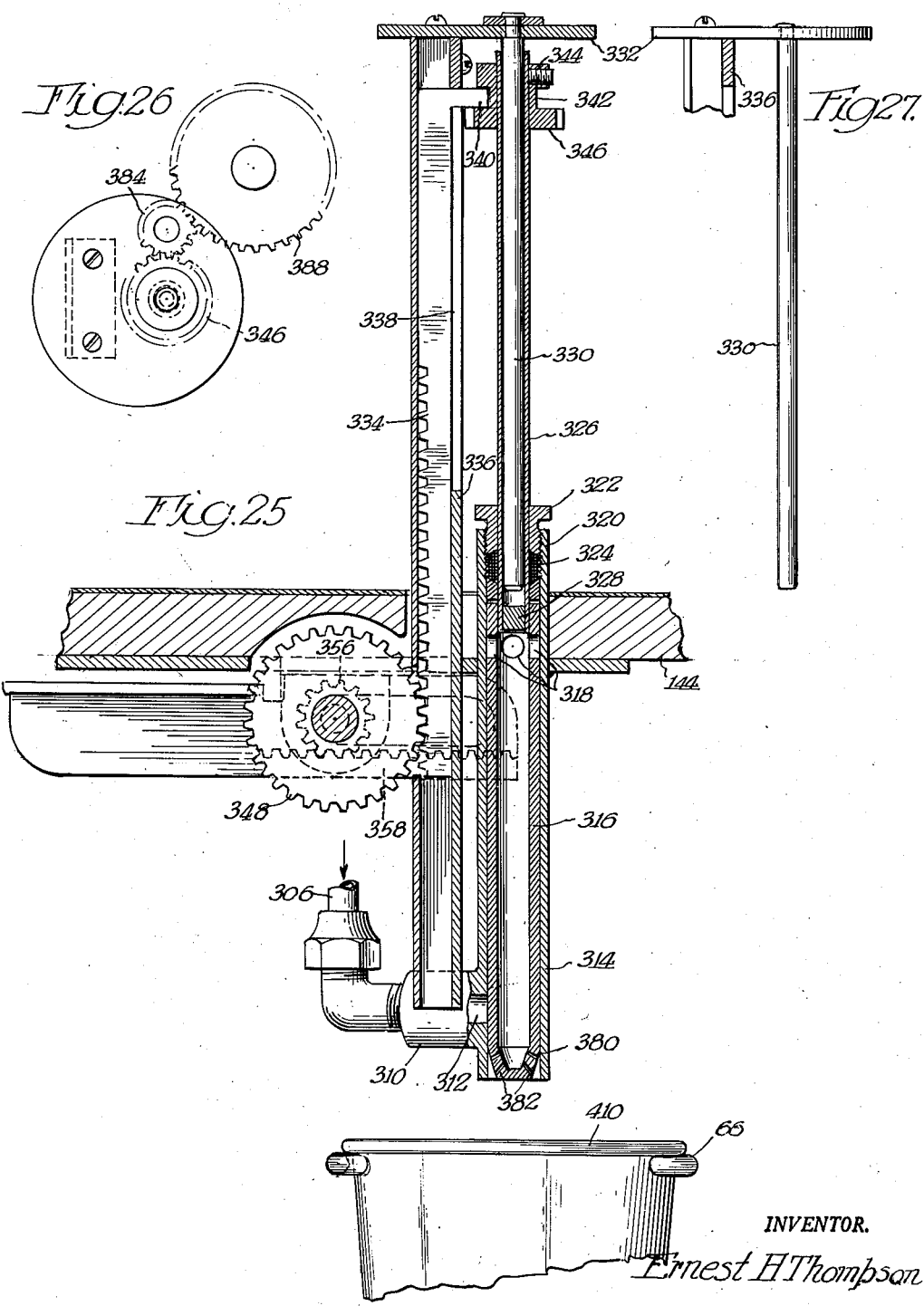

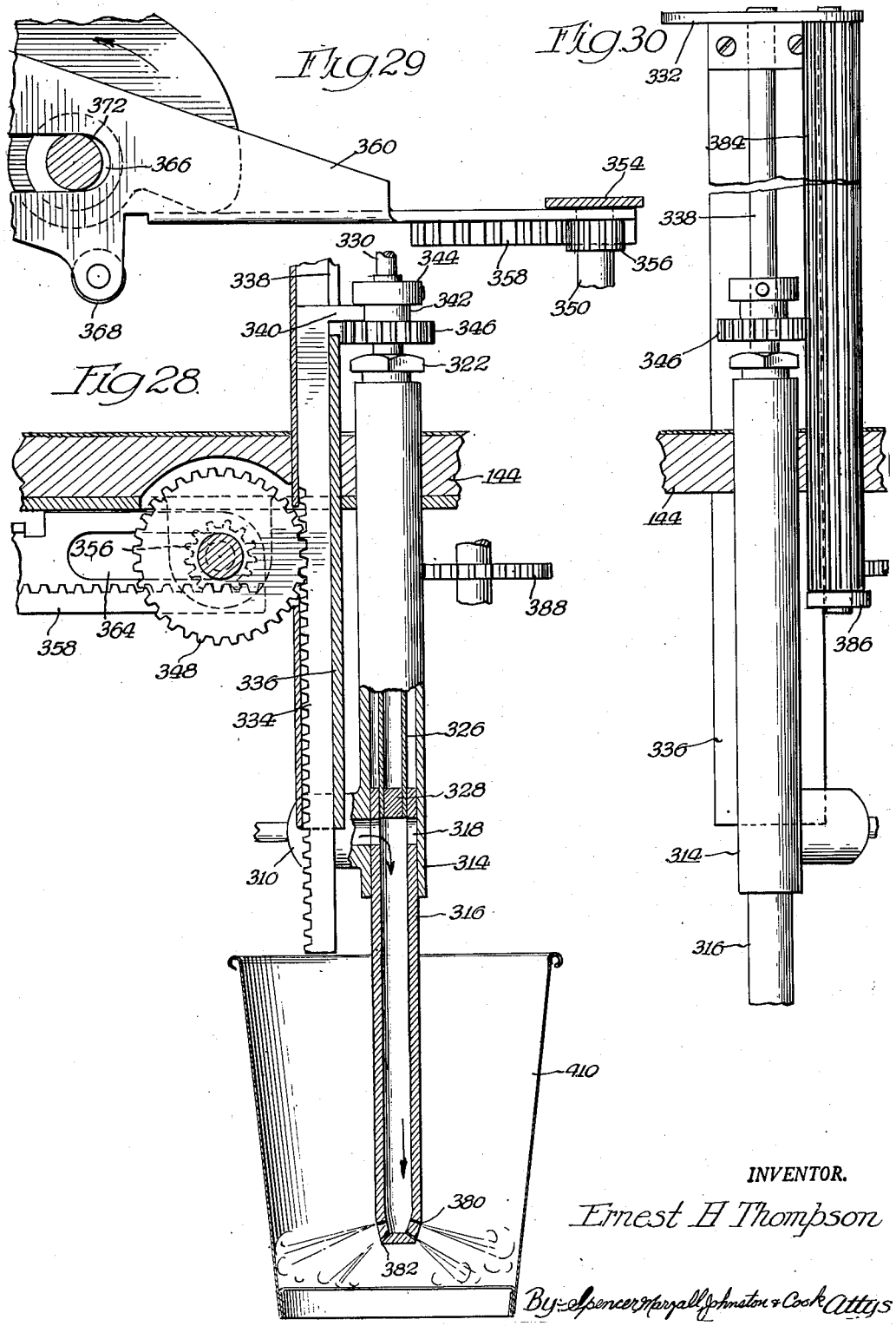

Aug. 3, 1954 E. H. THOMPSON 2,685,393
SELECTIVE BEVERAGE VENDING MACHINE
Filed April 26, 1947 23 Sheets-Sheet 16
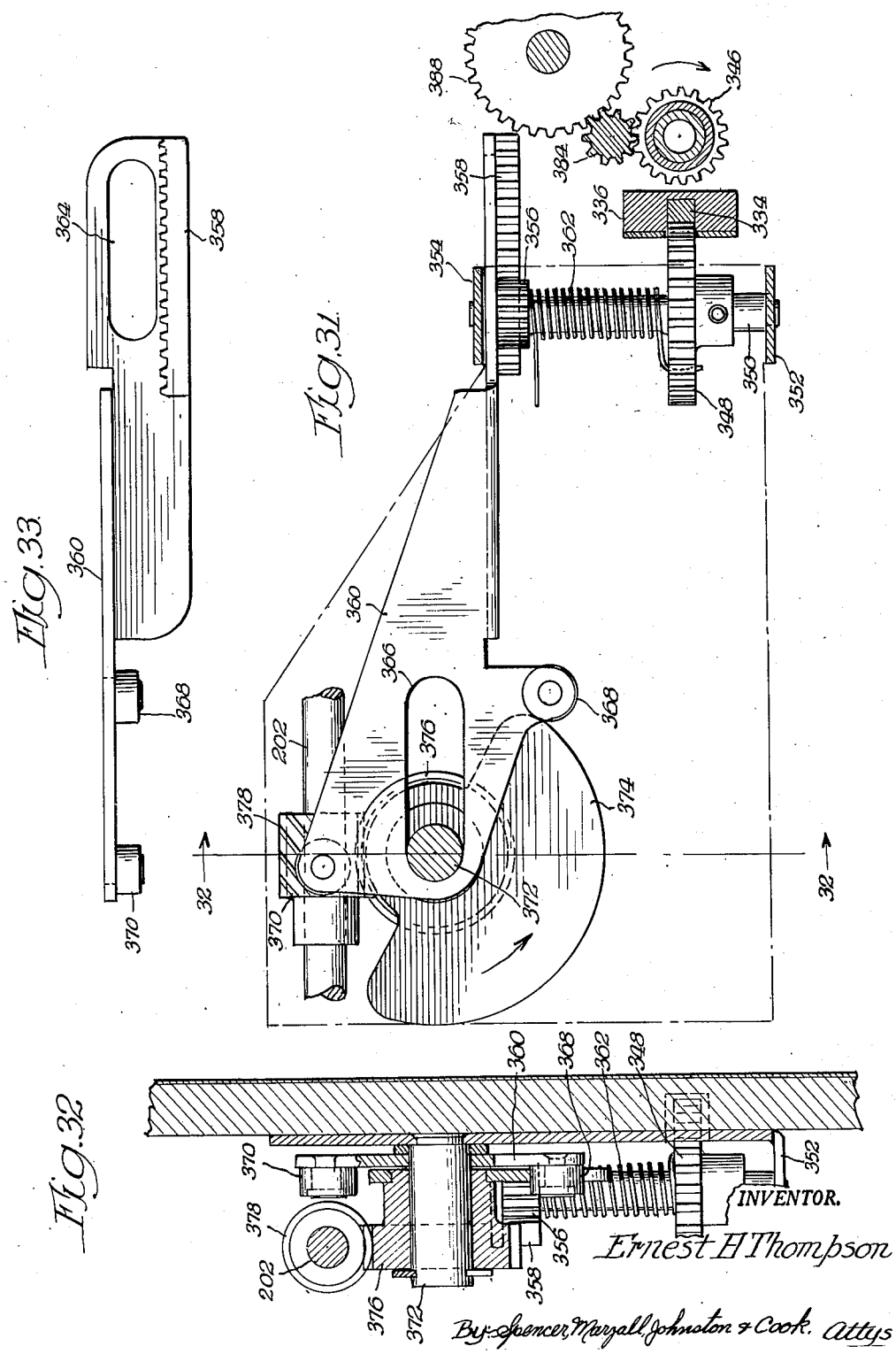
INVENTOR.
*Ernest H Thompson*
By *Spencer, Mayall, Johnston & Cook.* Attys

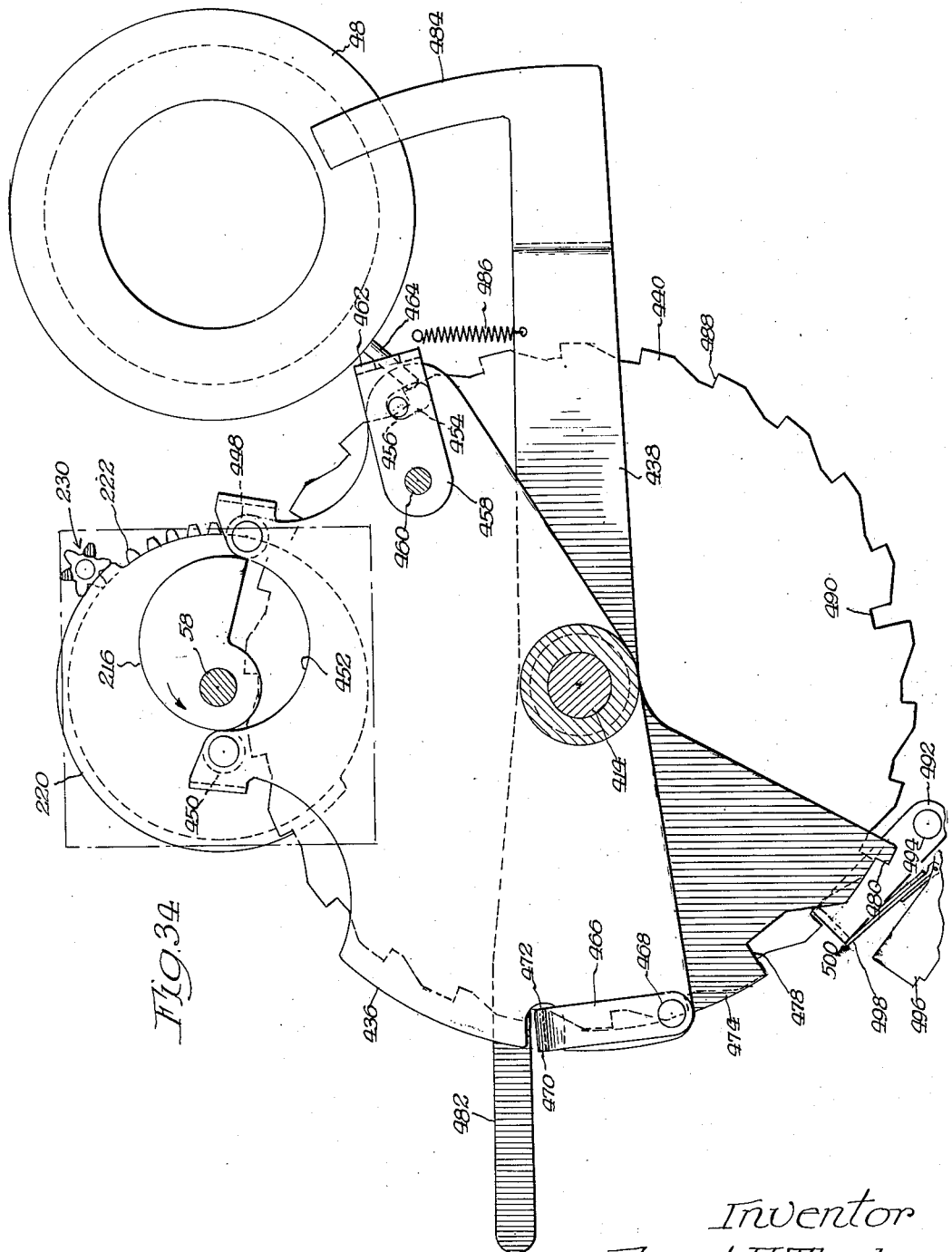

Aug. 3, 1954 E. H. THOMPSON 2,685,393
SELECTIVE BEVERAGE VENDING MACHINE
Filed April 26, 1947 23 Sheets-Sheet 18
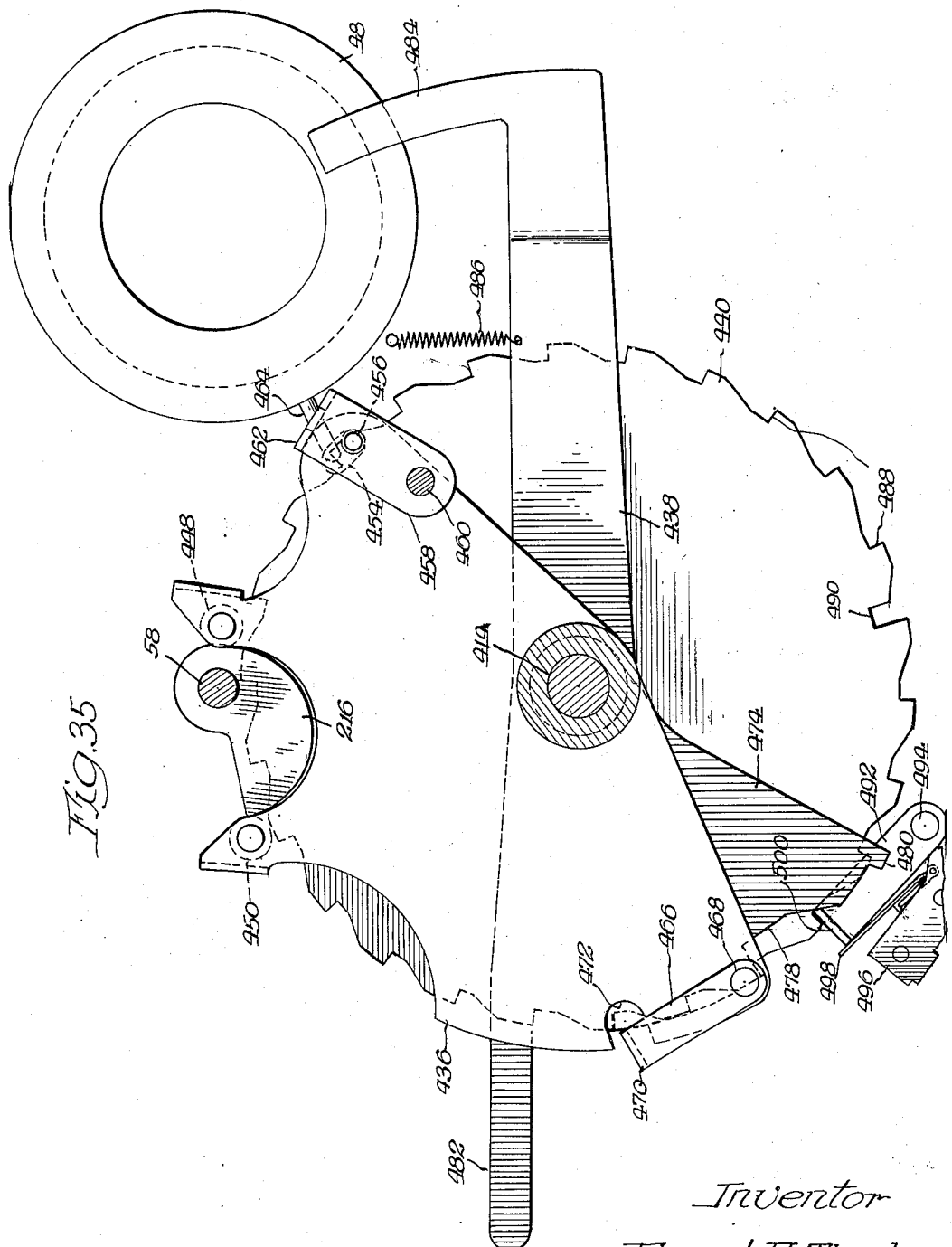
Inventor
Ernest H. Thompson
By Spencer, Marzall, Johnston & Cook Attys Aug. 3, 1954  E. H. THOMPSON  2,685,393
SELECTIVE BEVERAGE VENDING MACHINE
Filed April 26, 1947  23 Sheets-Sheet 19
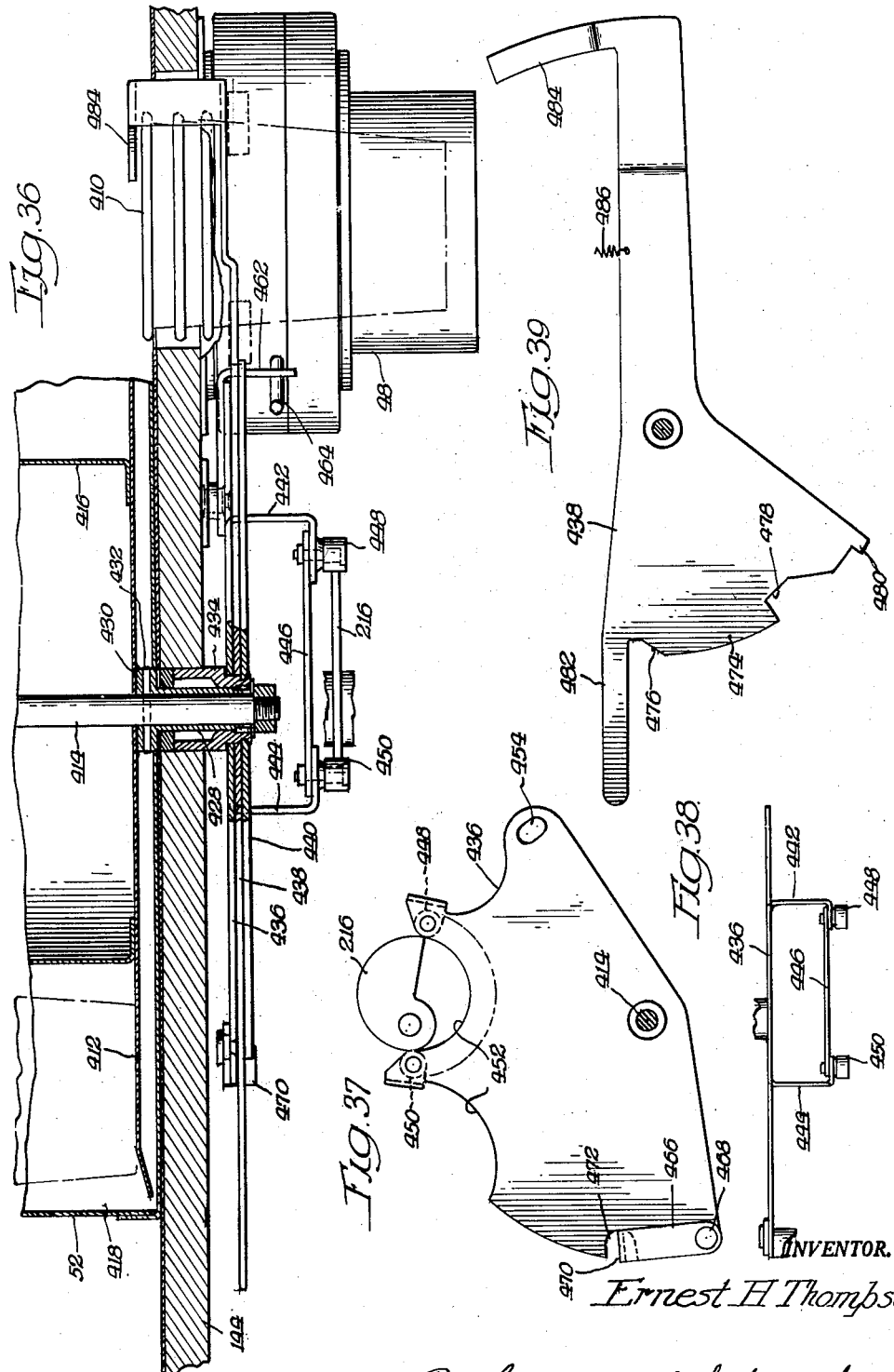
INVENTOR.
Ernest H Thompson
By: Spencer, Marzall, Johnston & Cook. Attys

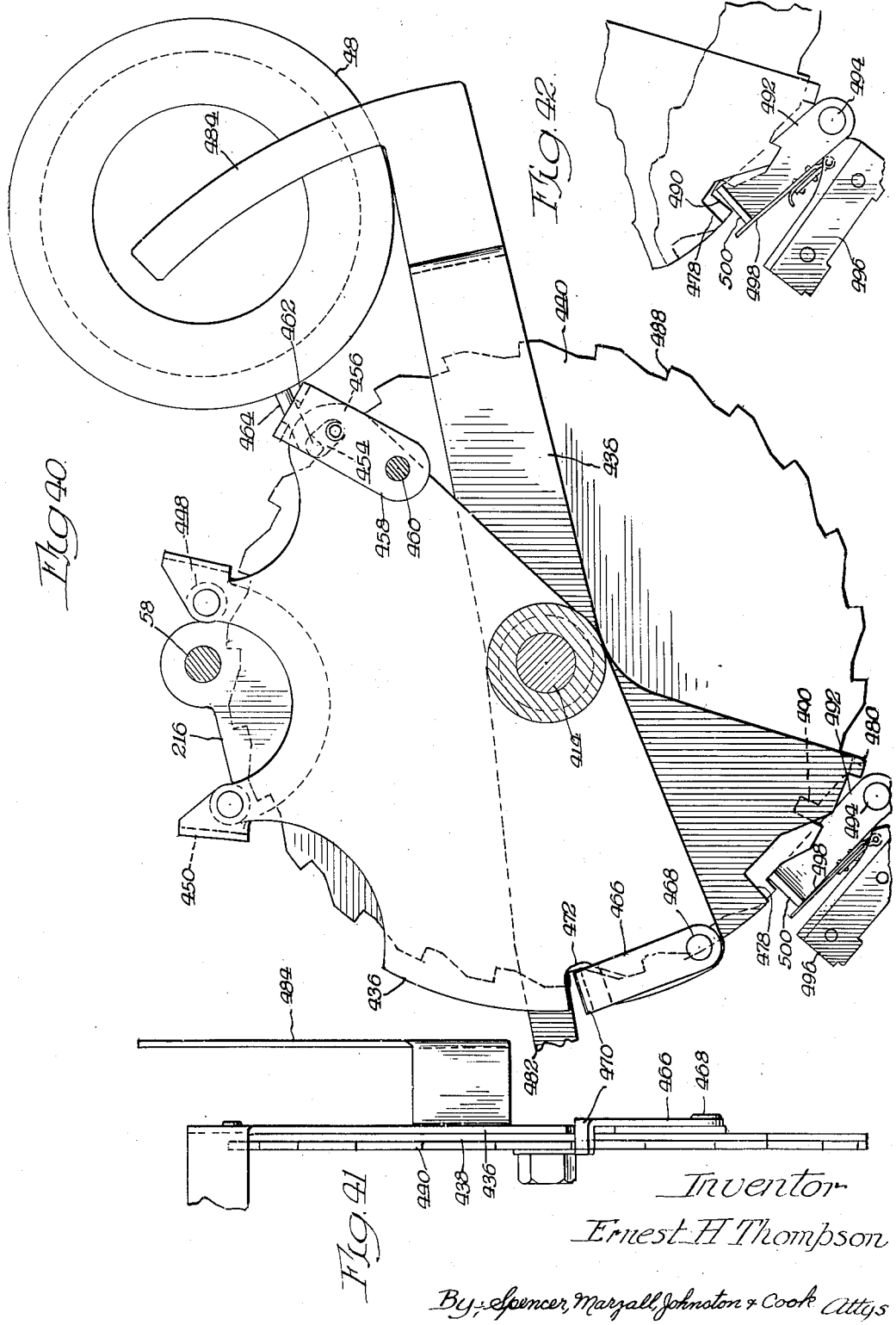

Aug. 3, 1954     E. H. THOMPSON     2,685,393
SELECTIVE BEVERAGE VENDING MACHINE
Filed April 26, 1947     23 Sheets-Sheet 21
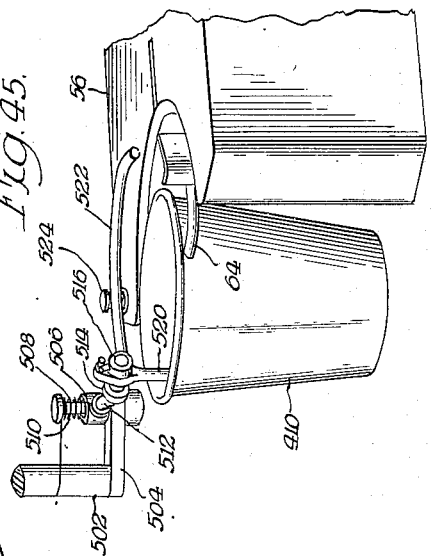
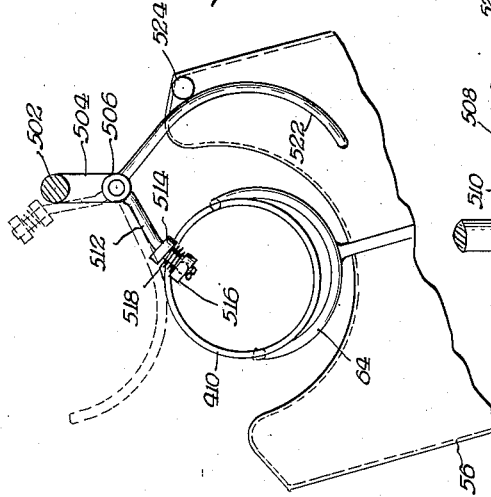
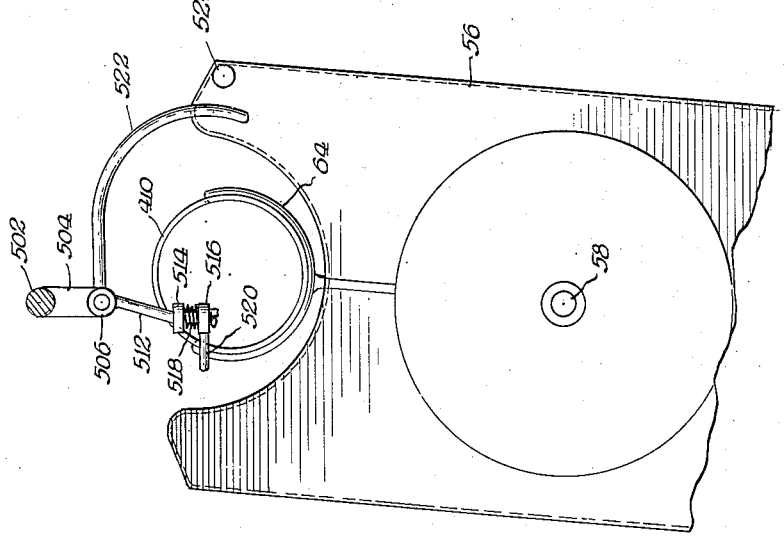
INVENTOR.
*Ernest H. Thompson*
By: *Spencer, Marzall, Johnston & Cook*
                                  *Attys*

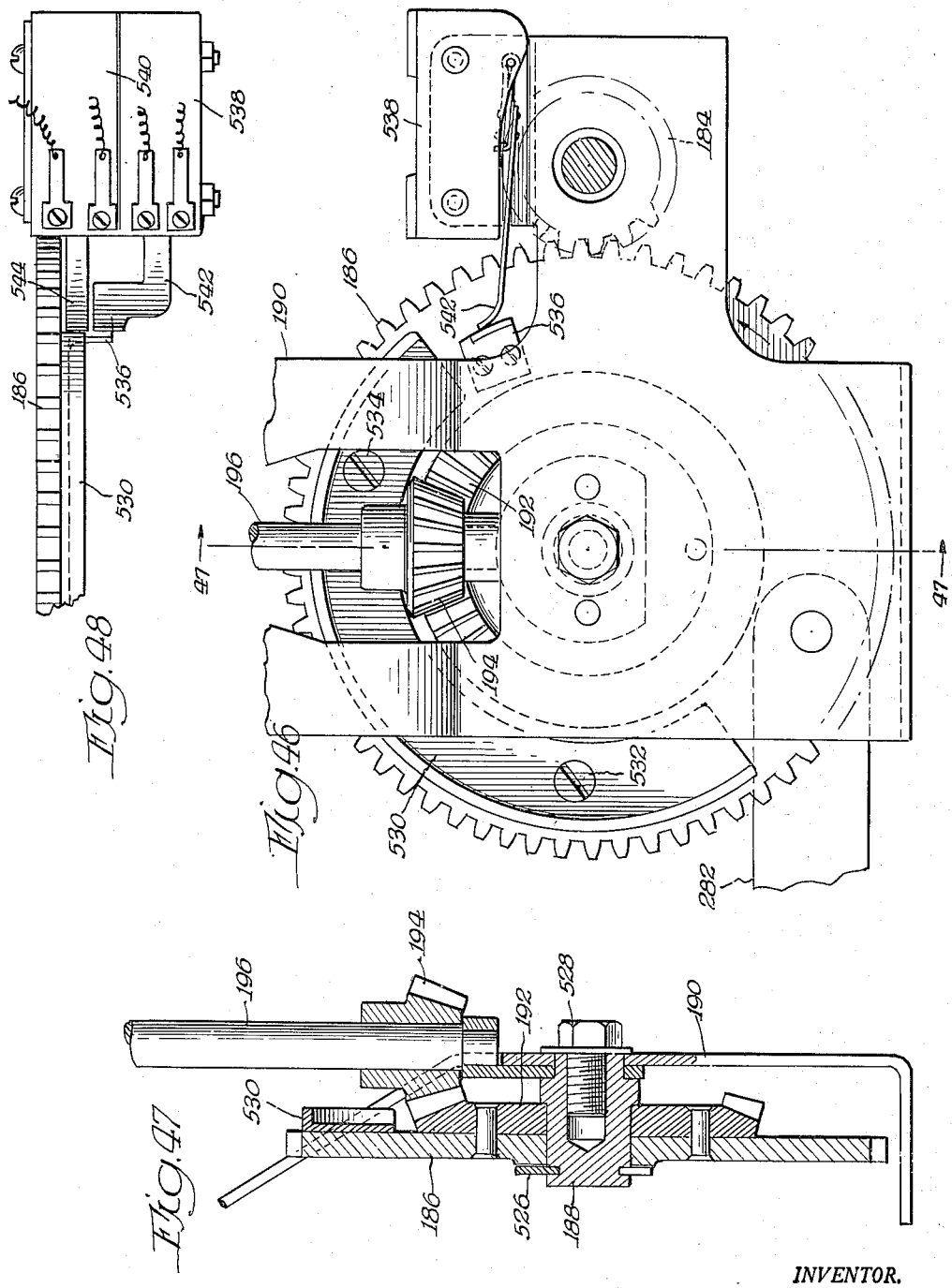

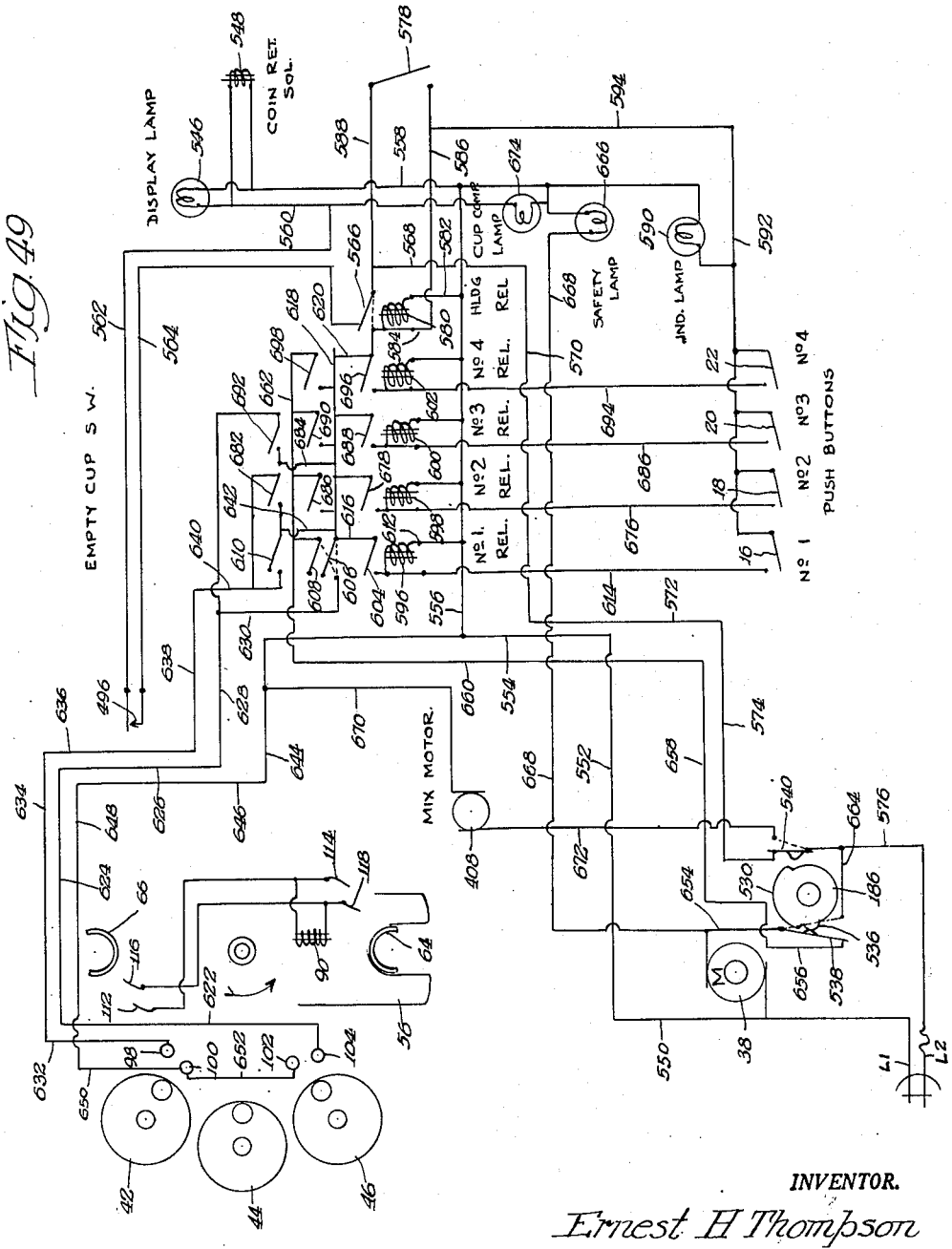

Patented Aug. 3, 1954

2,685,393

UNITED STATES PATENT OFFICE 2,685,393

SELECTIVE BEVERAGE VENDING MACHINE

Ernest H. Thompson, Glenview, Ill., assignor to Automatic Canteen Company of America, Chicago, Ill., a corporation of Delaware Application April 26, 1947, Serial No. 744,194

28 Claims. (Cl. 226—46.4)

This invention relates in general to beverage vending machines and in particular to a selective machine capable of dispensing any one of a plurality of beverages, depending upon the choice of the customer. The invention further relates more especially to a selective beverage vending machine wherein the basic beverage ingredients are preferably in the form of a powder or finely divided solids and are adapted to be mixed with a liquid such as water for forming the beverage.

Although the features and operation of the machine are particularly disclosed herein as being coin operated, thus making it necessary for a customer to deposit an acceptable coin before the machine will cycle, the invention may also be embodied in a machine without having the coin operated features included therein.

Selective beverage vending machine in general have been known heretofore and are on the market at the present time, but these machines are particularly adapted for the production of carbonated beverages where the basic beverage ingredients constitute a plurality of syrups with which carbonated water is mixed. While the basic features of the machine of the present invention may also be utilized for the production of such a beverage with slight modification, it is more particularly suited for the forming of beverages wherein the basic ingredients are in a powdered or finely divided form and may be mixed with a liquid such as plain rather than carbonated water. Another specific feature of the machine is the production of a hot drink, such as coffee, and may thus be further differentiated from earlier machines producing cold drinks.

The production of a hot drink, however, is not a necessary feature of the present invention since it may be utilized for making beverages other than coffee. For example, the containers which carry the powdered beverage ingredients may contain a variety such as powdered milk, powdered chocolate milk and powdered malted milk. In this event, the water to be mixed with these powdered ingredients would preferably be refrigerated rather than heated.

As illustrative of the present invention, the drawings show the machine as being particularly adapted for use in the production of hot coffee where the customer may have his choice of black coffee, coffee with cream, coffee with sugar, or coffee with cream and sugar. The production of a machine for accomplishing this purpose presents a number of problems not heretofore present in other selective beverage vending machines for the production of refrigerated carbonated beverages. For example, a problem arises in keeping the powdered beverage ingredient dry during excessively humid weather, such humidity tending to cake the powder and thus interfere with the production of a palatable beverage.

It should be pointed out still further that there may be numerous ways of producing the hot beverage, for example, it is preferable to provide only three containers, one containing powdered coffee, another powdered cream, and the third containing sugar. On the other hand it is also possible to provide four containers wherein the selected beverage ingredients are pre-mixed. That is to say, one container may have powdered coffee therein, another a mixture of powdered coffee and powdered cream, a third a mixture of powdered coffee and sugar, and a fourth a mixture of the coffee, cream and sugar. The resulting mixture or beverage would be substantially the same whether or not the ingredients are pre-mixed, but in the embodiment where the ingredients are not pre-mixed, it is only necessary to provide three containers instead of four which is an economic advantage.

The invention also embodies a further choice in that the powdered beverage ingredients may be dispensed into a separate container or zone where it is mixed with the incoming water prior to being dispensed into the drinking cup, or the ingredients may be deposited directly in the cup or receptacle and mixed with the water therein. In either case, a mixing zone must be provided whether such zone be the cup itself or a separate zone wherein the mixing takes place before it reaches the cup. The term "mixing zone," as used herein, is intended to embrace either of the foregoing alternatives.

Having the foregoing considerations in mind, then, it is one of the principal objects of the present invention to provide a selective beverage vending machine wherein a beverage is formed by automatically mixing a liquid and one or more beverage ingredients, where the basic ingredients are in a powdered or finely divided form. In this connection, it should be noted that, from the standpoint of making hot coffee, it would be possible to provide tanks for coffee syrup and simple syrup as well as liquid cream instead of using these ingredients in their powdered form. While the making of a beverage in this manner is within the contemplation of the present invention, it has been found preferable from the standpoint of keeping these ingredients fresh, and for sanitary reasons, to use the powdered form thereof.

Another object of the invention is to provide in a selective beverage vending machine a novel form of electric selective means operable in response to the actuation of an external control whereby one or more of the beverage ingredients may be utilized in the making of the beverage.

A further object of the invention is to provide a selective beverage vending machine wherein a plurality of containers for powdered or finely divided beverage ingredients are provided and electric selective means responsive to the actuation of a single external control will control the depositing of one or more of the powdered beverage ingredients into a mixing zone, whereupon a liquid is mixed therewith to form the selected beverage.

Still another and more specific object of the invention is to provide a novel form of container for carrying the finely divided beverage ingredients and from which a measured quantity of the ingredient may be easily dispensed into a mixing zone. Such a container is specifically designed to avoid any caking of the powder therein due to humidity or excessive moisture within the cabinet.

A still further and specific object is to provide a novel form of electric selective means for use in a selective beverage vending machine which is adapted to electrically select and deposit beverage ingredients into a mixing zone from one or more of the containers having the powdered ingredients therein.

Another object is to provide in a selective beverage vending machine novel drive means actuated by a single motor for cycling the machine to cause the complete admixture of one or more powdered ingredients and a liquid.

A further object is to provide in a selective beverage vending machine a novel form of liquid dispensing apparatus where the mixing of the powdered beverage ingredient and liquid occurs within the drinking cup or receptacle. In the form of the invention illustrated herein, the novel mixing device is adapted to be reciprocated into and out of the drinking receptacle, and while in the receptacle suitable means are provided for spraying the liquid into the receptacle in such a way that the powdered beverage ingredient or ingredients therein will be agitated and thoroughly mixed with the liquid.

Still another object is to provide a novel form of liquid supply means wherein the liquid is maintained at a suitable temperature and additional liquid is supplied each time a beverage is dispensed, so that the tank from which the liquid is removed will maintain the body of liquid therein at a constant temperature at all times.

Still another object is to provide in a selective beverage vending machine novel electrical means whereby a complete cycling of the machine is assured regardless of the actuation of any of the external controls or the depositing of additional coins during the cycle, except in the case of a complete power failure.

Other objects and advantages of the invention will become apparent upon reading the following description taken in conjunction with the accompanying drawings in which:

Fig. 5 is an enlarged fragmentary vertical sectional view taken substantially along the plane of line 5—5 of Fig. 4;

Fig. 6 is a plan view of the rotatable cup carriage;

Fig. 7 is a somewhat enlarged fragmentary vertical sectional view taken substantially along the plane of line 7—7 of Fig. 6;

Fig. 8 is a fragmentary plan view of the rotatable cup carriage, selector mechanism, and one dispensing unit or container wherein the selector means is shown in a position just prior to the dispensing of a powdered beverage ingredient from the container;

Fig. 9 is a plan view similar to that shown in Fig. 8 wherein the selector means attached to the cup carriage is shown in a position immediately after the dispensing operation;

Fig. 10 is a plan view of the mechanism shown in Figs. 8 and 9, but illustrating the position of the various elements at the final closing of the dispensing means;

Fig. 11 is a fragmentary plan view of the mechanism shown in Fig. 8 but illustrating the selector or dispenser actuating arm in a withdrawn position to permit the cup carriage to rotate without causing the dispensing of a particular powdered beverage ingredient;

Fig. 12 is an enlarged horizontal sectional view through one of the containers for a powdered beverage ingredient;

Fig. 13 is a vertical sectional view taken substantially along the plane of line 13—13 of Fig. 12;

Fig. 14 is a horizontal sectional view taken substantially along the plane of line 14—14 of Fig. 13;

Fig. 15 is a fragmentary enlarged vertical sectional view through the center of the cup carriage showing the intermittent drive mechanism therefor and taken substantially along the plane of line 15—15 of Fig. 3;

Fig. 16 is a plan view of the half gear utilized in the drive mechanism shown in Fig. 15;

Fig. 17 is a horizontal sectional view taken substantially along the plane of line 17—17 of Fig. 15;

Fig. 18 is a plan view of the locking disc as utilized in the drive mechanism shown in Fig. 15;

Fig. 19 is a plan view of the particular type of Geneva pinion which engages the driving gears shown in Fig. 15;

Fig. 20 is a side elevational view of the pinion shown in Fig. 19;

Fig. 21 is a fragmentary vertical sectional view showing particularly the liquid pumping system and taken substantially along the plane of line 21—21 of Figs. 2 and 22;

Fig. 22 is a fragmentary vertical sectional view taken substantially along the plane of line 22—22 of Fig. 21;

Fig. 23 is a fragmentary vertical sectional view through the machine from the front to the rear thereof illustrating the cup carriage, mixing device and cup dispensing unit;

Fig. 24 is a fragmentary elevational view showing the rotating means for the mixing device;

Fig. 25 is an enlarged vertical sectional view through the mixing device taken substantially along the plane of line 25—25 of Fig. 3 and showing the mixing device in its inoperative position;

Fig. 26 is a plan view of a detail of the operating mechanism for the mixing device;

Fig. 27 is an elevational view of the guide pin of the mixing device;

Fig. 28 is a vertical sectional view through the mixing device similar to Fig. 25, but showing the device in its operative position;

Fig. 29 is a fragmentary plan view of the actuating mechanism which initiates the vertical reciprocation of the mixing device;

Fig. 30 is a side elevational view of the mixing device looking toward the left in Fig. 28;

Fig. 31 is a plan view of the mixing device and its actuating mechanism;

Fig. 32 is a vertical sectional view taken substantially along the plane of line 32—32 of Fig. 1;

Fig. 33 is a side elevational view of the reciprocating actuator plate for the mixing device;

Fig. 34 is a top plan view of the actuating mechanism for the cup dispenser in one extreme position thereof and illustrating also the cup empty lock arm;

Fig. 35 is a view similar to Fig. 34 but showing the actuating mechanism for the cup dispenser in its other extreme position;

Fig. 36 is a side elevational view with certain parts broken away and shown in section of the mechanism shown in Figs. 34 and 35;

Fig. 37 is a plan view of the actuator plate for the cup dispenser;

Fig. 38 is a side elevational view of the plate shown in Fig. 37;

Fig. 39 is a plan view of the cup empty lock arm;

Fig. 40 is a plan view of the actuating mechanism for the cup dispenser similar to Fig. 34 but showing the empty lock arm in its actuated position when a cup stack has been depleted;

Fig. 41 is a side elevational view of the mechanism shown in Fig. 40;

Fig. 42 is a fragmentary plan view of the cup empty lock pawl and the empty cup switch in their positions when the cup stacks are exhausted;

Fig. 43 is a plan view of the waste cup remover;

Fig. 44 is a plan view of the waste cup remover shown in Fig. 43 in a different position;

Fig. 45 is a perspective view of the waste cup remover;

Fig. 46 is a side elevational view of a part of the driving means and the full stroke switch;

Fig. 47 is a vertical sectional view taken substantially along the plane of line 47—47 of Fig. 46;

Fig. 48 is a fragmentary top plan view of the mechanism shown in Fig. 46; and

Fig. 49 is a schematic wiring diagram.

Figure 1:
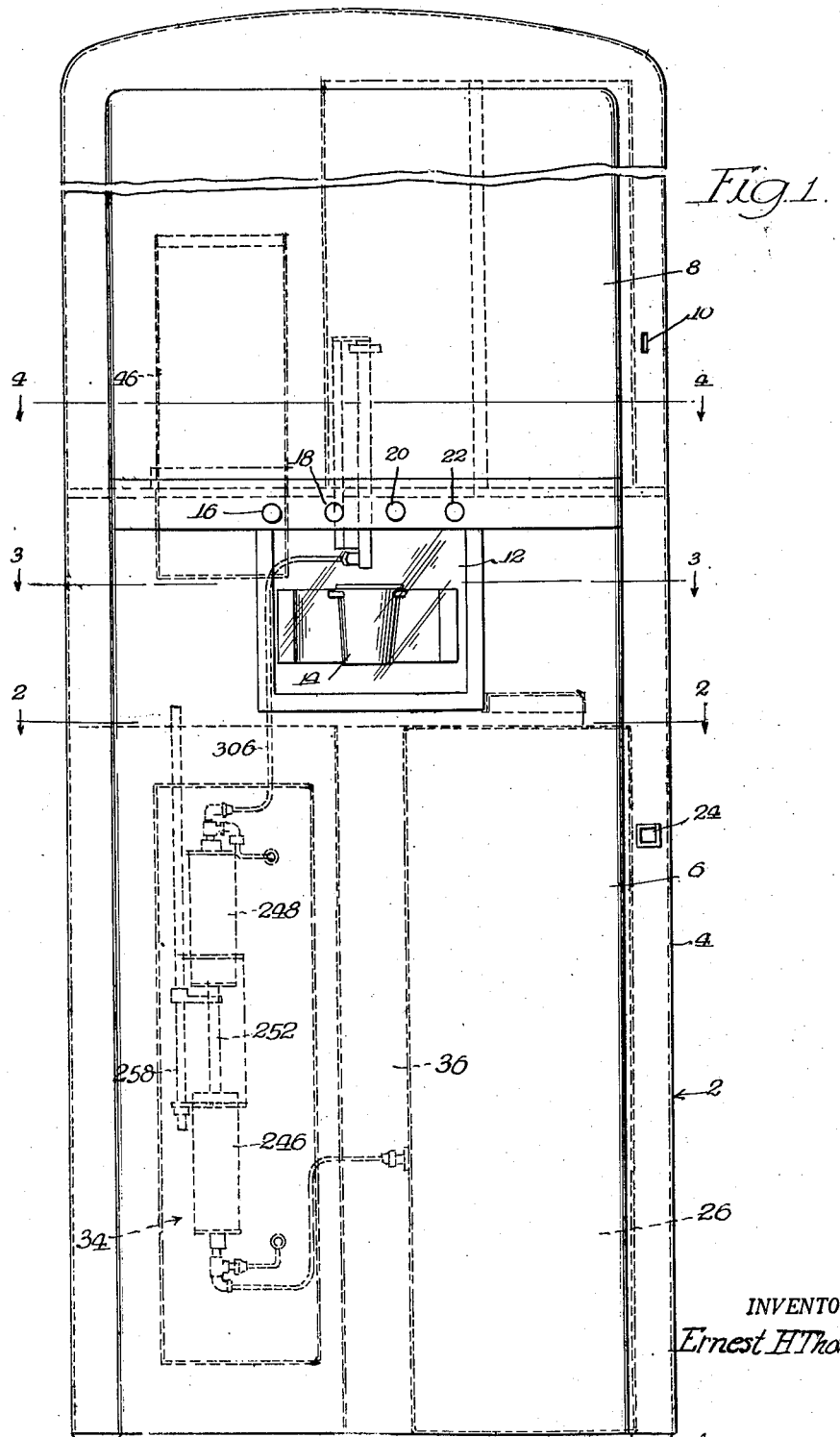
Fig. 1 is a front elevational view of the machine embodying the present invention.
Figure 2:
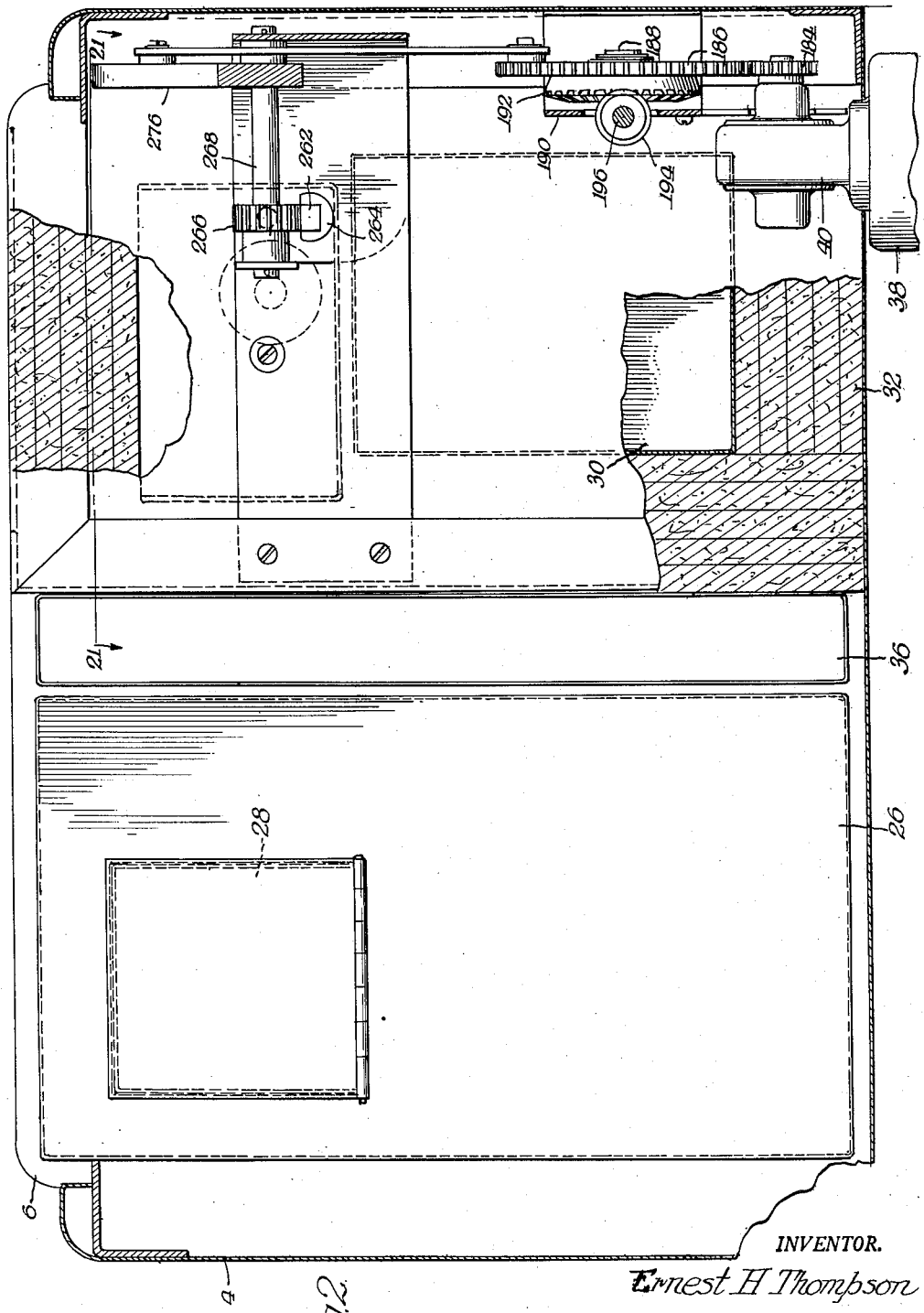
Fig. 2 is a horizontal sectional view, with parts broken away and sectioned to show details, taken substantially along the plane of line 2—2 of Fig. 1.

A general understanding of the arrangement and location of some of the parts of the machine may be had by reference to Figs. 1 and 2 wherein the machine in general is indicated by the numeral 2 and includes a main body portion or cabinet 4 with a door 6 pivotally mounted thereon at the front thereof to facilitate access to the interior of the machine. The upper part 8 of the door may be utilized for any desired purpose such as advertising or other types of displays.

A coin slot 10 is also located in the door and is adapted to receive a coin for the purpose of energizing an electric circuit to place the machine in readiness for operation in accordance with a selection subsequently made by a customer. At a suitable location in the door, an opening 12 is provided within which a receptacle in the form of a drinking cup may be disposed for the purpose of receiving the beverage whereupon it will be made available to the customer. A plurality of external controls in the form of push buttons 16, 18, 20 and 22 are also located on the front of the door, any one of which may be actuated to cycle the machine after the deposit of an acceptable coin.

The coin mechanism used may be any of the well known and suitable types, not specifically shown herein, and for a detailed description of a preferable type of coin mechanism, reference is made to my earlier filed copending application entitled "Coin Mechanism," filed April 8, 1946 and bearing Serial No. 660,455. The coin mechanism customarily utilizes a slug rejector device and will permit an acceptable coin to continue through a coin chute to an adapted mechanism from which the coin may either be passed on to a coin box upon the cycling of the machine or may be returned to the coin return slot 24 if the coin is deposited either during the cycling of the machine or if the cup stacks have been depleted.

As explained above, the present invention is particularly directed to the production of a hot beverage and the illustrated form of the invention includes a cold water tank 26 provided with a suitable opening 28 in the top thereof where the tank may be refilled. At the opposite side of the machine a hot water tank 30 is located which is surrounded by a heavy coating of insulation 32 and into which the cold water may be delivered for purposes of heating.

A novel form of pumping system 34, for transferring cold water to the hot water tank and for transferring a quantity of heated water from the hot water tank to the mixing zone, is also located adjacent the front of the machine in a suitable position to be connected to both the hot and cold water tanks. The identical system of liquid supply may be utilized for the production of a cold drink in this type of machine, it being merely necessary to substitute a suitable type of refrigerating mechanism to cool the water instead of heating device. In the present instance, the water may be heated by the use of the well known caloroid tube (not shown).

A waste liquid receptacle 36 may be located between the hot and cold water tanks and so positioned to receive the overflow, spilled or beverage discarded by the customer.

A motor 38 is preferably located at the back of the machine and is utilized through a gear reduction means 40 to actuate the machine and cause a cycling thereof.

The foregoing will present a general picture as to the machine itself, and for convenience to enable a more clear understanding of the various details of the machine, the description may be divided into the following sections:

1. The selector means (Figs. 3 through 11)
2. The basic ingredient dispensing units (Figs. 12, 13 and 14)
3. The driving mechanism (Figs. 2, 3, and 15 through 20)
4. The liquid supply means (Figs. 2, 21 and 22)
5. The mixing device (Figs. 23 through 33)
6. The cup dispenser and cup empty lock (Figs. 34 through 42)
7. The waste cup withdrawal means (Figs 43, 44 and 45)
8. The full stroke switch (Figs. 46, 47 and 48)

9. The electric circuit (Fig. 49)
10. Operation of the machine

It will be understood that each of the above outlined features of the machine performs a certain function which, when combined with each other function, contributes to the new and improved result obtained by the present invention. The invention is, therefore, based upon a new and improved combination of elements adapted to permit the selection, mixing and dispensing of a beverage in a new and simpler manner. The features above enumerated may be more clearly understood by reference to the following description.

The selector means

The manner in which the present specific illustration of the machine may be modified for the use of alternative methods has been explained hereinabove. The present drawings and description illustrates a preferred embodiment of the invention and specific reference to the elements illustrated is not intended to be limiting. Figs. 3 through 11 of the drawings illustrate three containers which are adapted to carry the various basic beverage ingredients in a powdered or finely divided form. These three containers may be conveniently referred to by the numerals 42, 44 and 46.

It is a matter of choice as to which particular ingredient is located in any container, but for purposes of this description it may be assumed that container 42 has sugar therein, container 44 is provided with powdered coffee, and container 46 has powdered cream.

In the operation of the machine a rotatable cup carriage is provided and which is adapted to be rotated a one-half revolution for one complete cycle of the machine. Each end of this carriage is adapted to support a drinking cup and the cup at one end is adapted to pass beneath an opening in the bottom of each ingredient container as the cup carriage rotates. Suitable selecting means may be actuated whereby selected ingredients are deposited within the cup as it is moved by the carriage, and when the cup reaches its final destination at the front of the machine, a mixing device is actuated for the purpose of mixing hot water with the ingredients to form the beverage.

As stated previously herein, it is within the contemplation of the present invention to either pre-mix the selected ingredients in powdered form within the various containers, or suitable means may be provided in the form of a separate mixing zone wherein the powdered ingredients may be deposited and mixed with the water therein prior to dispensing in the cup. The illustrated form of the invention, however, is preferred and at the back of the machine the usual and customary form of cup dispenser 48 may be mounted and adapted to support a cup stack 50. A cup stack magazine 52, maintaining a plurality of cup stacks 54, may be located at the upper part of the cabinet to thereby provide an adequate supply of drinking cups, all as will be more fully explained hereinafter.

The cup carriage 56 is in the form of a rectangular body pivotally mounted on and adapted to rotate about a vertically extending shaft 58 at substantially the center thereof. Each end of the carriage 56 is provided with a concave portion 60 and 62, each of which is adapted to receive an arcuate support 64 and 66 (see Fig. 6). One or the other cup support is adapted to be normally positioned beneath the cup dispenser 48 during periods when the machine is not in operation, and at the end of each cycle suitable mechanism is actuated to dispense a cup into a cup support at the back of the machine, whereby the cup may be in position for the next succeeding cycle.

An opening 68 is provided in the bottom of each of the containers 42, 44 and 46 which is normally closed, but which may be opened, if selected, at a suitable time during the cycling of the machine, whereupon a measured quantity of a selected basic powdered or finely divided ingredient may be dispensed therethrough to a drinking cup as it passes therebelow. The details of the dispensing means will be described more fully in a succeeding section, but for present consideration it will be sufficient to state that this operation occurs.

A spider having a plurality of outwardly extending fingers is located underneath each container. These fingers are of alternate lengths, the longer fingers of each spider being indicated by the numeral 70, and the angularly extending end portions thereon by the numeral 72. The shorter fingers are indicated by the numeral 74. When any one of the short fingers 74 is contacted and caused to rotate the spider, a predetermined amount of beverage ingredient will be dispensed from the container through its opening 68.

An elongated arm 76 extends outwardly at one end of the carriage 56 and along the side of the cup receiver 64. A similar arm 78 is likewise positioned at the opposite end of the carriage and adjacent the cup receiver 66. These arms are suitably mounted in brackets 80 and 82 for longitudinal reciprocation, each being normally in its outermost position. If the cup carriage 56 were to be rotated a one-half revolution, and the selector arm 76 (Fig. 6) were to remain in its outermost position as shown, it would contact one of the short fingers 74 associated with each of the containers 42, 44 and 46. A quantity of beverage ingredients from each container would then be deposited in the cup located in the cup receiver 64. In the present instance, this would result in a cup of coffee having both cream and sugar.

If, however, the selector arm were to be withdrawn or moved longitudinally inwardly before it reached the spider associated with any one of the containers, then that particular spider would not be rotated and the beverage ingredient contained therein would not be dispensed. As will become apparent hereinafter, the electric circuits are so associated with the external controls that the actuation of any one of them will control the dispensing of the beverage ingredient indicated.

Figure 3:
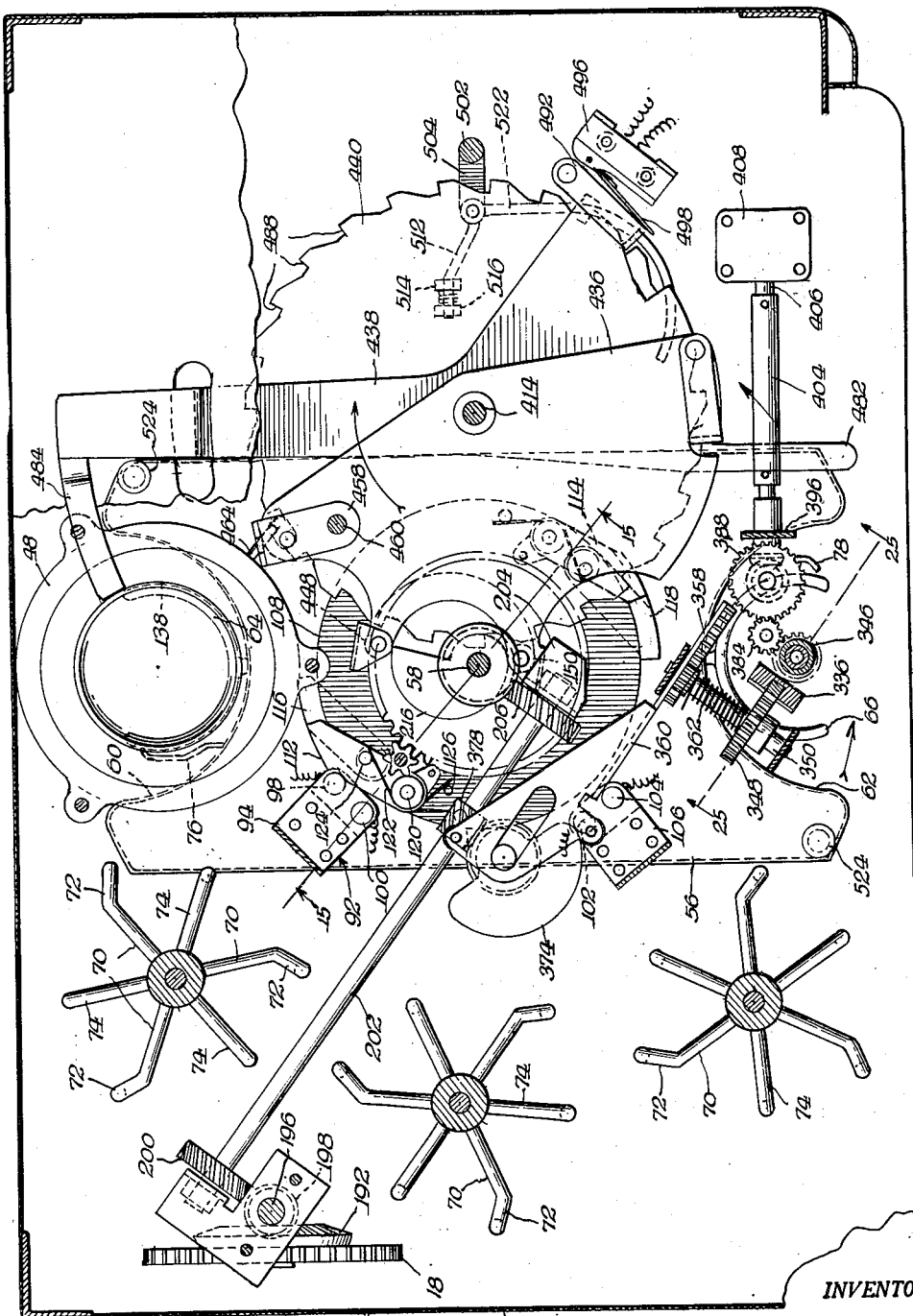
Fig. 3 is a horizontal sectional view taken substantially along the plane of line 3—3 of Figs. 1 and 5.

It will be clear that after the cup carriage 56 is rotated through a one-half revolution, due to the cycling of the machine, from its position shown in Fig. 3, the cup receiver 66 and its associated selector arm 68 will then be in a position to receive the next succeeding cup for receiving the selected beverage ingredients during the next cycle of the machine.

For this reason, the two selector arms 76 and 78 are tied together by a link 84 pivotally mounted at its center as indicated at 86. A coiled tension spring 85 connected at one end to the link 84 and at its other end to a bracket 87 maintains the two selector arms normally in their extended position. The arm 78 is suitably connected to the armature or plunger 88 of a solenoid 90 mounted on the cup carriage 56. Energization of the solenoid 90 will cause an inward movement of the armature 88 and the selector arm 78. Such an inward movement of the arm 78 will likewise cause a similar inward movement of the selector arm 76 through the link connection 84. This arrangement will necessitate the use of but a single solenoid for the operation of both selector arms.

The energizing of the solenoid 90 is effected by certain electrical contacts suitably positioned adjacent the cup carriage 56 and which are permanently mounted so that they will remain stationary during the cycling of the machine. The first of these electrical contacts may be generally indicated by the numeral 92 and will comprise a bracket 94 mounted on a stationary part of the machine. An insulated disc 96 on the bracket 94 (see Fig. 7) carries two electrical contact posts 98 and 100, the contact post 98 extending below the post 100.

The bracket 92 in the present instance which carries the contact posts 98 and 100 is located adjacent the first or rear container 42 and a second set of contact posts 102 and 104 mounted on a bracket 106 is identical in all respects to the assembly indicated at 92 and is located adjacent the container 46. The cup carriage 56 has mounted thereon an insulated disc 108 by means of the spacer bolts 110, which disc is provided with the pivotally mounted shoes 112 and 114 at the upper side thereof and similar shoes 116 and 118 at the underside thereof. The shoes 112 and 116 are substantially 180° away from the other shoes 114 and 118 so that one pair will come into use for actuating the selector arms during one cycling of the machine and the other pair of shoes will be adapted to actuate the selector arms during the next succeeding cycle thereof. The upper shoe 112 is mounted for pivotal movement on a pivot pin 120, but is normally held in its outward position by means of a coiled spring 122 having one end thereof bearing against a stud 124 on the shoe itself and the other end thereof bearing against a similar stud 126 mounted on the disc 108. The bottom shoe 116 associated therewith is mounted for pivotal movement on the underside of the disc 108 by means of the pivot pin 128, and is held in its outermost position by means of a coiled spring 130 having one end thereof bearing against a stud 132 on the shoe itself and the other end thereof bearing against a similar stud 134 extending downwardly from the underside of the disc 108. The mounting of the shoes 114 and 118 at the opposite side of the disc is identical and it is believed that a description of one set and its function will be sufficient.

From the position of the cup carriage in Fig. 6, it will be caused to rotate in a counter-clockwise direction during the cycling of the machine. During this rotation the upper shoe 112 will come against the contact post 100, and at the same time the lower shoe 116 will bear against the under contact post 98. The two shoes 112 and 116 are electrically connected to the solenoid 90 and, assuming that the post 100 is continually energized during the cycling of the machine, and that a proper external control has been actuated to energize the post 98, when the shoes 112 and 116 contact the respective posts 100 and 98, this will cause a circuit to be closed through the solenoid 90 to thereby energize the solenoid and withdraw the selector arms 76 and 78. When this occurs, the beverage ingredient in the container 42, in this case sugar, will not be dispensed because the selector arm 76 will have been removed from the path of the arm 74 on the spider of that particular container.

If, however, the particular external control which has been actuated is not one which will energize the post 98, then the two shoes 112 and 116 contacting these posts will have no effect on the solenoid 90 and the selector 76 will remain in its outermost position to thereby actuate the spider and dispense the beverage ingredient from the container 42.

An identical arrangement is set up with respect to the container 46 where the bracket 106 carries the post 102 and 104. It may be assumed for present purposes that the pots 104 is continually energized. If the post 102 is not energized by the actuation of an external control, then the contacts of the shoes 112 and 116 against these two posts will have no effect on the solenoid 90 and the selector arm 76 will again remain in its outermost position to actuate the spider and dispense the ingredient from the container 46. If, however, the external control selected is one which will energize the post 102, then when the two shoes contact these posts the circuit will be completed through the solenoid 90 to energize it and withdraw the selector arm 76, whereupon the ingredient in the container 46 will not be dispensed.

In this particular embodiment of the invention where hot coffee is the beverage being mixed, the coffee itself is an essential ingredient and must be dispensed at every cycle of the machine. For this reason it is necessary that the selector arm always be in its outermost position when it reaches the container 44 where the coffee is stored. It will never be necessary to energize the solenoid at this point in the cycle and therefore any similar arrangement of contact posts just described may be omitted from any association with this particular container.

As mentioned earlier in this description, when the beverage ingredients are in powdered or finely divided form, it is necessary that precaution must be taken to prevent dampness or humid air from reaching the powder and thus causing it to cake. For this reason it is highly desirable that the opening 68 in the bottom of each container be normally closed at all times except during the period of actual dispensing. It has been seen how the selector arm 76 uncovers the opening 68 to permit a powdered ingredient to be dispensed therethrough, and suitable means must then be provided to close the opening after the dispensing has been accomplished. For this purpose, a second arm in the form of a plate 136, having an enlarged portion or rib 138 thereon, is secured to the cup carriage at the opposite side of the cup receiver 64. This arm is adapted to contact the outermost end 72 of one of the fingers 70 to further rotate the associated spider and close the opening 68 through which an ingredient has just been dispensed.

An understanding of this phase of the operation, as well as the complete dispensing step, may be made more clear by reference to Figs. 8 through 11. Fig. 8 illustrates the container 42 where the cup carriage 56 has just started its rotative movement. This series of figures illustrates the operation with respect to one container when the external control selected is one which will not energize the solenoid and will thereby cause a dispensing of the ingredient contained in the container 42. Here it will be noted in Fig. 8 that the selector arm 76 is in its outermost position and is just in contact with one of the short fingers 74 associated with that container. As the rotation of the cup carriage continues, it will rotate the spider and cause a measured quantity of powdered beverage ingredient to be dispensed through the opening 68 and into the cup resting in the cup receiver 64. This step is illustrated in Fig. 9 and shows the opening 68 uncovered. At this point the arm 138 is shown just in contact with the outer extremity 72 of a finger 70, and Fig. 10 illustrates that a continued rotation of the cup carriage will close the opening 68 by means of this contact of the arm 138 against the finger 70.

The plate 136 is so constructed at its outer peripheral edge as to provide a second arm 140 spaced from the arm 138 for the purpose of maintaining the spider in its proper position and in readiness for the next cycle. In other words, if the spider tends to move beyond its proper position, the next succeeding finger 74 will prevent any further rotation by contacting the arm 140. During continued rotation, the arm 140 will also come against the outer extremity 72 of a finger 70 and thus prevent any rotation of the spider in the opposite direction. This is clearly illustrated in Fig. 10 of the drawings.

Fig. 11 shows the selector arm 78 in its withdrawn position which it assumes upon energization of the solenoid 90. It will be clear that the arm is withdrawn a sufficient distance to completely miss all fingers of the spider during rotation of the cup carriage. Likewise, the shorter fingers 74 are of such length that the arm 138 will also miss the spider. Therefore, as long as the solenoid remains energized, the particular container which is being passed by the cup carriage will not dispense any of the beverage ingredient contained therein.

*The basic ingredient dispensing units*

All of the dispensing units 42, 44 and 46 which contain the basic finely divided beverage ingredients have identical structures and a description of one will suffice for all of them. Figs. 12, 13 and 14 illustrate in detail a typical construction and for purposes of illustration, it may be assumed that the center container 44 is shown in these figures. The container is preferably of a substantially tubular shape and it is provided with an annular outwardly extending flange 142 at a suitable location between its ends. Each container is adapted to be received within an opening in a horizontally positioned partition or shelf 144 within the cabinet and the flange 142 is adapted to rest on said shelf.

At a suitable location around the periphery of the flange 142 it is provided with an arcuate recess 146 which is adapted to cooperate with a hold-down member 148 having a substantially frustro-conical shape. The hold-down member has a downwardly extending pin 150 secured thereto and which extends downwardly through the shelf 144. The lower end of the pin has a flange 152 thereon and is adapted to receive a coiled compression spring 154 which bears at one end against the flange 152 and at its other end against the under side of the shelf 144. When the container is initially positioned, the recess 146 will be placed in alignment with the hold-down member 148, but after the flange 142 comes to rest against the upper side of the shelf 144, the container is given a slight turn thereupon positioning the flange 142 beneath the hold-down member 148, which securely holds the container in place.

As mentioned above, the bottom of the container has a dispensing opening 68 therein, and immediately above the bottom a disc 156 is located which has a plurality of openings 158 therein, each of which is adapted to be moved into alignment with the opening 68 during successive cycles of the machine. The finely divided beverage ingredient within the container will normally drop downwardly and completely fill each of the openings 158 to thereby measure a predetermined quantity of the ingredient. As the disc 156 rotates, the quantity of ingredient within the next succeeding opening 158 will drop downwardly through the opening 68 when the two openings become in alignment.

A segmental disc 160 is positioned immediately above the disc 156 and is permanently secured in place to the side of the container by means such as a screw or rivet 162. This segmental disc is positioned immediately above the opening 68 so that each time the disc 156 is rotated to carry a measured quantity of the ingredient within an opening 158 toward the opening 68, the segmental disc 160 will act to remove any of the ingredient above the surface of the disc 156, thereby insuring that only a predetermined amount of ingredient will be dispensed into the mixing zone through the opening 68.

It has been found highly desirable to agitate the finely divided or powdered beverage ingredient during a cycling of the machine to prevent the ingredient from becoming settled or caked against one side of the container. For this purpose agitating means in the form of a centrally located sleeve member 164 is provided which has integral therewith or otherwise suitably secured thereto a plurality of outwardly extending curved arms 166. The number of such arms is preferably, though not necessarily, equal to the number of openings 158.

The entire structure is so arranged that when one of the selector arms 76 or 78 is in its outward position and contacts one of the arms 74 for actuating the dispensing means, the disc 156 and the agitator arms 166 will be caused to rotate therewith. The entire assembly of disc 156 and sleeve 164 is suitably mounted on a centrally located vertically extending shaft 168. The bottom of the shaft is adapted to receive first a sleeve 170 which may be keyed to the shaft by means of a key 172 or a set screw 174, or both. The sleeve 170 constitutes the center support of the spider which contains the arms 70 and 74. This spider is inserted on the lower part of the shaft 168 and is held in place by means of a washer 176 and a thumb screw 178. The container itself with the disc 156 and the segmental disc 160 is then inserted or placed over the upper end of the shaft 168 and may come to rest against the upper side of the sleeve 170. The sleeve 164 is then placed over the shaft 168 and the sleeve and shaft are provided with complementary shoulders 180 to limit the downward movement of the sleeve thereon. A suitable screw 182 is threadedly received within the upper end of the shaft 168 to thereby secure the entire assembly together. The construction is such that the disc 156 and sleeve 164 will rotate with the shaft 168 when the spider, including the arms 70 and 74, is rotated by one of the selector arms 76 or 78. The preferable means by which this may be accomplished is to provide a double-D slot in the members which are to be rotated, which slots will be received by a portion of the shaft 168 having opposing flat surfaces thereon as indicated in Fig. 14.

It will thus be apparent that when one of the selector arms 76 or 78 is in its outermost position, due to the de-energized solenoid 90, such arm will contact the end of one of the spider arms 74 to thereupon rotate the sleeve 170 and shaft 168. Such a rotation of the shaft will carry with it a similar rotation of the disc 156 and the agitating arms 166, whereupon a measured quantity of a basic beverage ingredient will be carried to and dispensed through the opening 68 in the bottom of the container.

The driving mechanism

Figs. 2, 3, 5 and 15 through 20 illustrate the means by which the machine is caused to cycle. The driving means causes the cup carriage 56 to rotate through a one-half revolution, and certain other means in connection therewith are caused to rotate through a complete revolution. After an acceptable coin has been deposited in the machine and the customer has actuated a selected external control, an electric circuit causes the motor 38 to operate. As explained hereinbefore, suitable gear reducing means 40 is provided which has a shaft extending outwardly from one side thereof on which is mounted a pinion 184 in mesh with a larger gear 186 mounted on a stub shaft 188. This shaft is suitably journaled for rotation between the sides of a bracket 190 and also has keyed thereto a bevel gear 192. A bevel pinion 194 is mounted on a vertically extending shaft 196 and is adapted to be in mesh with the bevel gear 192, whereupon actuation of the motor 38 will cause a rotation of the vertical shaft 196.

A spiral gear 198 is also mounted on the vertical shaft 196 and is spaced upwardly from the bevel pinion 194, which spiral gear is adapted to be in mesh with another spiral gear 200 mounted at one end of a horizontal shaft 202. A view of Fig. 3 will illustrate that this shaft 202, while being in a substantially horizontal plane, extends in an angular direction forwardly toward the front of the machine and at its forward end is journaled for rotation in a bearing 204. Also adjacent this end of the shaft 202 a second spiral gear 206 is mounted thereon, adapted to be in mesh with another spiral gear 208 mounted for rotation on the vertical shaft 58 extending vertically through the center of the cup carriage 56.

The spiral gear 208 is located adjacent a plate having a bearing 210 thereon within which the upper end of the shaft 58 is journaled for rotation (see Fig. 15). The gear 208 has a downwardly extending hub 212 thereon which terminates in a sleeve portion 214 around the shaft 58. This sleeve portion 214 has mounted thereon a cam 216, the purpose of which will appear more fully hereinafter, a spacer member 218, a locking disc 220, and a half gear 222. These various members are secured together in their proper relationship by means such as the pin 224. Thus far, it will be seen that actuation of the motor 38, through the mechanism just described, will impart a rotative movement to the spiral gear 208 and the cam 216, locking disc 220 and the half gear 222. The motor is geared so that during one cycle of the machine, each of these members will complete one full revolution.

The lower part of the vertical shaft 58 is provided with a sleeve 226 on which is mounted the cup carriage 56 and the insulated disc 108. A full gear 228 is also mounted on the sleeve 226 whereby rotation of the full gear 228 will cause a rotation of the cup carriage 56 and the insulated disc 108. The means by which a full revolution of certain parts connected indirectly to the motor 38 is caused to occur, while only a half revolution is imparted to certain other elements, is illustrated more clearly in Figs. 15, 17, 19 and 20, which means may be termed a Geneva type of movement.

This motion is caused by means of a pinion 230 which is so constructed as to have every other tooth 232 extending the full width thereof, and every other tooth 234 extending only through two-thirds of the width thereof. This pinion is mounted on a stub shaft 236 extending downwardly from the underside of the shelf 144 and the teeth 232 thereof are adapted to contact the locking disc 220, while the full teeth 234 are adapted to be in mesh with the half gear 222 and full gear 228.

Fig. 16 illustrates the construction of the half gear where it will be seen that one-half of its periphery is provided with a plurality of teeth 238 and the other half of its periphery is made smooth and of a smaller diameter as illustrated at 240. The pinion 230 will be rotated only while the teeth 234 thereof are in mesh with the teeth 238 on the half gear. During a one-half revolution of the half gear, the pinion 230 will remain idle. Fig. 18 illustrates the construction of the locking disc where it will be evident that half of the periphery 242 is of a large diameter, equal to the diameter of the full gear 228 and that portion of the half gear containing the teeth 238. The other half 244 of the locking disc will have a smaller diameter substantially equal to the diameter of the smooth half of the half gear indicated at 240. The relationship of these various gears and locking disc is illustrated in Fig. 17 where it will be clear that the bottom half of the teeth 234 in the pinion 230 will be in mesh with the teeth on the full gear 228 at all times. During the first half of the revolution of the half gear 222, the teeth 238 thereon will be in mesh with the upper half of the teeth 234 on the pinion 230. At this point the smaller diameter 244 of the locking disc 220 will be adjacent the pinion 230 to thereby permit rotation of the pinion. Such rotation will thereupon impart a similar rotation to the full gear 228 as well as the insulated disc 108 and cup carriage 56 connected thereto. After the locking disc and half gear have completed a one-half revolution from their position shown in Fig. 17, the smooth part of the periphery 240 of the half gear will then be adjacent the pinion 230 and will no longer cause that pinion to rotate. Furthermore, that half 242 of the locking disc having the larger diameter will also be adjacent the pinion 230 and will positively prevent any rotation thereof. When the pinion 230 is not rotated, the full gear and the parts connected therewith will not be rotated, whereupon it will be evident that a full and complete revolution of the spiral gear 208 will cause a complete revolution of the cam 216, locking disc 220 and half gear 222, but will permit only a one-half revolution of the gear 228, the insulated disc 108 and the cup carriage 56.

The liquid supply means

The novel means by which hot or cold liquid may be supplied to the mixing zone or the mixing device may be more clearly understood by reference to Figs. 1, 21 and 22. The liquid supply means embodies certain novel features comprising a pumping device 34 which is adapted to simultaneously withdraw liquid from one compartment and deposit it into another compartment while withdrawing liquid and delivering it to the mixing zone. While the novel pumping means disclosed herein is equally adaptable for use in connection with cold beverages, it is illustrated herein particularly in connection with the making and dispensing of hot coffee. The liquid in most cases is assumed to be water, although it is not necessarily limited to any particular liquid.

In the present invention it is contemplated that a separate tank 26 is the storage tank for the cold water. A second and insulated tank 30 is adapted to store the hot water which may be heated by any suitable means. Pumping means are provided to supply a measured quantity of cold water to the hot water tank at the time a like quantity of water is dispensed from the hot water tank to the mixing zone, so that a constant amount of water is maintained at all times within the hot water tank, which is also maintained at a constant temperature.

The particular mechanism of the preferred embodiment of this feature includes a pair of vertically disposed cylinders 246 and 248, one above the other. These cylinders are mounted on and supported by means of a bracket 250 secured to a stationary part of the machine. Each cylinder is provided with a piston having a common piston rod 252 extending between them, and suitable means are provided to impart a vertical reciprocation of this piston rod during a cycling of the machine. An outwardly extending arm 254 is mounted on the piston rod 252, which arm 254 is bifurcated at one end and is adapted to be received in opposing slots in the piston rod 252 as more clearly shown in Fig. 22. The other end of the arm 254 is provided with a hub 256 integral therewith and which is secured to a vertically reciprocating shaft 258. Reciprocation of this shaft will thereupon impart a like reciprocating movement to the piston rod 252 and the pistons connected therewith.

The shaft 258 extends upwardly and at its upper end has an L-shaped bracket 260 secured thereto, which bracket has a horizontal leg and a vertical leg. The vertical leg thereof is adapted to support a rack 262 mounted for a vertical reciprocating movement within a rack guide 264. A pinion 266 in mesh with the rack 262 is mounted on a horizontal shaft 268 which is journaled at one end thereof in a bearing 270 and at its other end in a bearing 272. The other end of the shaft 268 is provided with a similar pinion 274 adapted to be in mesh with a gear segment 276 pivotally mounted at its upper end by means of a stub shaft 278. The periphery of the gear segment 276 is provided with a plurality of teeth 280 adapted to mesh with the teeth on the pinion 174.

A link 282 is pivotally mounted at one end thereof to the gear segment 276 by means of a pivot pin 284 and at its other end is secured by means of the pivot pin 286 to the gear 186 driven by the motor 38.

It has been stated above that during a cycle of the machine the gear 186 will be moved through one complete revolution, and during that revolution the gear 186 will carry with it the link 282 and move it in a reciprocating movement. The resulting reciprocation of the link 282 will carry with it a similar reciprocation of the gear segment 276. This moveemnt of the gear segment will impart a rotary reciprocating motion to the pinion 266 in mesh with the rack 262 thus causing the rack to reciprocate first downwardly then upwardly. This vertical reciprocation of the rack will impart a like reciprocation to the piston rod 252 and to the pistons connected therewith, as will be apparent.

The bottom cylinder 246 is provided with a pipe connection 288 which has a pair of check valves 290 and 292. The check valve 290 is located in a conduit 294 connected to the cold water tank 26, while the check valve 292 is located in a conduit 296 connected to the hot water tank 30. These check valves are so arranged that a downward movement of the piston rod 252 will force the liquid contained in the cylinder 246 through the conduit 296 and into the hot water tank, and upward movement thereof will draw from the cold water tank a quantity of liquid through the conduit 294 and into the cylinder 246.

The upper cylinder 248 is likewise provided with a connection 298 having a pair of valves 300 and 302. The valve 300 is located in a conduit 304 connected to the hot water tank 30 and the valve 302 is located in a conduit 306 which extends to the mixing zone or, in this case, to a suitable mixing device. It will thus be evident that a downward movement of the piston rod 252 will first draw into the cylinder 248 a quantity of hot liquid through the conduit 304. Upward movement thereof will force the hot liquid outwardly through the conduit 306 and into the mixing zone.

Any suitable thermostat means such as indicated at 308 may be utilized for maintaining a constant temperature of the liquid within the hot water tank. A cycle of the machine will cause a complete downward and upward movement of the piston rod 252, and during this movement, while hot water is being drawn out of the tank and in to the cylinder 248, a like quantity of cold water will also be delivered to the hot water tank to thus maintain the quantity of water therein constant. During the upward movement of the piston rod 252, and while the hot water is being dispensed to the mixing zone, a fresh quantity of cold water is being drawn from the cold water tank and deposited into the cylinder 246 in readiness for its immediate deposit into the hot water tank during the first half of the next cycle of the machine.

The mixing device

Inasmuch as the present machine is designed particularly for the mixing of beverages wherein the basic beverage ingredient is in a finely divided form, a novel mixing device has been designed which is particularly applicable for the forceful spraying of liquid into the mixing zone, which results in a thorough admixture of the liquid and solid materials. The basic principle underlying this feature of the present machine is disclosed in my copending application entitled "Mixing Device" filed February 2, 1946 and bearing Serial No. 645,053.

The operation of the mixing device and the actuating mechanism therefor in connection with the present machine is clearly illustrated in Figs. 23 through 33 of the drawings. The conduit 306 extending from the liquid supply cylinder 248 and which carries the heated liquid therefrom is connected to an inlet pipe 310 having a passage 312 therein which leads to the interior of a vertically extending tubular supporting member 314. In the present instance, this mixing device is located adjacent the front of the cabinet where the receptacle reposes after having received the selected beverage ingredient or ingredients.

A tubular member or plunger 316 is mounted for vertical reciprocation within the tube 314 and is provided with a plurality of radial openings 318 adjacent its upper end, which openings are adapted to come into register with the passage 312 when the plunger 316 is in its lowermost position as shown in Fig. 28.

The upper end of the tube 314 is internally threaded as at 320 to threadedly engage a packing nut 322 containing a quantity of packing 324 to thereby effect a seal against the leakage of any liquid therefrom. A smaller tube 326 is adapted to be slidably received within the packing nut 322. The lower end of the tube 326 contains a plug 328 and is also suitably secured to the upper end of the plunger 316. A guide rod 330 positioned above the mixing device is supported at its upper end on the plate 332 and extends downwardly within the small tube 326, acting as a guide therefor during reciprocation thereof. A vertical reciprocation of the tube 326 will carry with it the plunger 316 to its lowermost position as shown in Fig. 28, and to its uppermost position as shown in Fig. 25.

A vertical reciprocation is imparted to the tube 326 and plunger 316 by means of a vertically extending rack 334 adapted to reciprocate within the rack guide 336. The back end of the guide 336 is provided with an elongated vertical slot 338 to slidably receive an extension 340 at the upper end of the rack 334. The outer end of the extension 340 is received within an annular groove 342 provided between the flange 344 and gear 346 mounted on and secured to the upper end of the small tube 326. The vertical reciprocation of the rack 334 will therefore impart a similar vertical movement to the small tube 326 and plunger 316.

The drive means for the rack 334, while partially shown in Figs. 25 and 28, is completely illustrated in Fig. 31 to which particular reference will now be made. A pinion 348 is in mesh with the rack 334 and is mounted on and secured to a horizontally extending shaft 350 journaled for rotation at each end thereof in bearings provided by the legs 352 and 354 of a bracket. The other end of the shaft 350 carries a pinion 356 in mesh with a horizontally positioned rack 358 mounted on a plate 360. A coiled torsion spring 362 surrounds the shaft 350 and has one end thereof secured to the pinion 348 for the purpose of picking up any backlash in the rack 334 and tends to throw the rack down at all times.

It will be apparent that horizontal reciprocation of the rack 358 will cause a vertical reciprocation of the rack 334 through the pinions 356 and 348. The vertical part of the plate 360 which carries the rack 358 has an elongated slot 364 therein to receive one end of the shaft 350 to thereby permit the plate and rack to reciprocate.

The horizontal part of the plate 360 is also provided with a similar slot 366 and a pair of cam rollers 368 and 370. The slot 366 receives a stub shaft 372 which carries a cam 374 and a spiral gear 376. The spiral gear 376 is in mesh with a spiral gear 378 positioned on the horizontal shaft 202, and the manner in which this mixing device is actuated by means of the motor 38 may become apparent upon viewing Fig. 3. During a cycling of the machine which rotates the shaft 202 through one complete revolution, as explained above with respect to the driving mechanism in general, this revolution of the shaft and gear 378 mounted thereon will impart a full revolution to the cam 374. This cam will rotate in a counter-clockwise direction as viewed in Fig. 31 and the edge thereof will alternately contact the two cam rollers 370 and 368 on the plate 360 to thereby impart a reciprocating movement thereto as well as to the rack 358.

Fig. 25 illustrates the plunger 316 of the mixing device in its uppermost and inoperative position, and in this position the parts of its driving mechanism will be as illustrated in Fig. 31. Immediately upon the starting of the motor 38 and rotation of the shaft 202, the cam 374 will begin to rotate, and just prior to the completion of a one-half revolution of this cam 374, the edge thereof will contact the cam roller 370 and begin a downward movement of the plunger 316. This plunger will reach its lowermost position immediately after the completion of the first half revolution, or the first half cycle of the machine.

In the present arrangement, where the mixing is accomplished in the receptacle, it will be understood that during the first half cycle of the machine, the receptacle is being carried by its carriage 56 and is receiving the selected beverage ingredients contained in any one or more of the containers 42, 44 and 46. At the completion of the first half cycle of the machine the receptacle will then be in position at the front of the cabinet and below the mixing device, and since the plunger is adapted to be moved downwardly to a position within the receptacle, it should not start its downward movement until just before the receptacle reaches its final position. Furthermore, after the mixing has been accomplished, the plunger 316 must be elevated to permit removal of the receptacle, and this is accomplished just prior to the completion of the full cycle of the machine when the edge of cam 374 comes against the cam roller 368 to reciprocate the racks 358 and 334 in the opposite direction.

It has been mentioned that the liquid which forms a part of the beverages will be carried through the passage 312 and into the tubular member 314. When the plunger 316 is in its lowermost position, the openings 318 therein will be in register with the passage 312 so that liquid passing therethrough under pressure will pass through the openings 318 and downwardly within the plunger 316.

The lower end of this plunger is provided with a plurality of openings preferably positioned angularly and in more than one plane. For example, the upper row of openings may be indicated by the numeral 380 while the row therebelow is indicated at 382. Both of these rows of openings or orifices are preferably disposed angularly and outwardly, and the lower row 382 is preferably disclosed at a greater angle than those orifices indicated at 380. The purpose of providing such openings is fully set forth in my above referred to copending application on the mixing device, but for the present it may be stated that when the basic beverage ingredients are in a finely divided or powdered form, it is highly important that they be thoroughly agitated and mixed with the incoming water or other liquid. An arrangement like that disclosed, forces the incoming liquid from the passage 312 downwardly and outwardly in the form of a spray, which spray will have two levels and will be disposed at preferably two different angles. The liquid passing through the orifices 382 will agitate the finely divided beverage ingredient and part of it will be thrown upwardly into the path of the liquid being sprayed outwardly through the orifices 382. This will insure that none of the ingredient remains to form globules or to be undissolved on the surface of the final mixed beverage.

Mechanism is also provided to cause a rapid rotation of the plunger 316 at least during the period of time liquid is being dispensed therethrough. A rotary spray will additionally insure a thorough admixture of the liquid and solid materials. In the present machine it has been found expedient to rotate the plunger 316 by means of an independent motor, although this may not be necessary and it is not intended that this phase of the invention be limited to such independent means. The rotation is effected through the gear 346 which is in mesh with an elongated vertically extending pinion 384 journaled for rotation at its upper end in the plate 332 and at its lower end in a bracket 386. This elongated gear is necessary because the gear 346 moves upwardly and downwardly with the plunger 316, and this arrangement makes it possible for the rotation to start before mixing begins to insure that the plunger 316 will be rotating at full speed when the liquid spray begins.

Fig. 24 illustrates the details of the mechanism which causes a rotation of the gear 384 and includes a gear 388 in mesh therewith mounted on a shaft 390 journaled for rotation in the legs 392 and 394 of a bracket 396 secured to the underside of the shelf 144. A bevel gear 398 is also mounted on the shaft 390 and is in mesh with another bevel gear 400 mounted on the shaft 402. Suitable keying means connects the shaft 402 with one end of the shaft 404, the other end of which is secured to the shaft 406 of the motor 408. As will become apparent when the wiring diagram is considered, the motor 408 begins to operate after the machine has completed about half of its cycle and continues to operate until the cycle of the machine is completed. This will insure a rapid rotation of the plunger 316 while in its lowermost position and during the time that liquid is being dispensed therethrough.

It will therefore be evident that the main motor 38 not only drives the cup carriage 56, but also reciprocates the plunger 316 in timed relation with the pumping of the liquid thereto. The plunger 316 reaches its lowermost position at approximately the time the first half cycle of the machine is completed, and on the second half cycle the liquid supply means acts to pump the liquid into the receptacle 410. During all of this time, the motor 408 has been causing the plunger 316 to rotate to insure the spraying of the liquid into the receptacle 410 in the form of a rotary spray. The amount of liquid dispensed will depend upon the capacity of the cylinder 248, and will be sufficient to fill the receptacle 410. After all of the liquid has been dispensed, and just prior to the end of the machine cycle, the plunger 316 will begin to move upwardly and at the end of the cycle will have reached its uppermost position, whereupon the rotary movement thereof will also cease.

The cup dispenser and cup empty lock

Further features of this invention include the means by which a cup or receptacle 410 may be dispensed into its support or receiver on the cup carriage 56 near the end of each cycle of the machine in readiness for the next cycle, as well as the mechanism to cause additional cup stacks to be delivered to the cup dispenser after a previous cup stack has been depleted. In the present machine, a cup stack magazine is provided to deliver a cup stack after each preceding stack has been depleted. Furthermore, novel means are included whereby the entire machine will be rendered inoperative if the supply of all cup stacks has been depleted. The relationship between the various parts of this mechanism and other portions of the machine may be seen in various figures of the drawings such as Figs. 3, 4 and 5, but the details may be more clearly understood by reference to Figs. 34 through 42.

Figure 4:
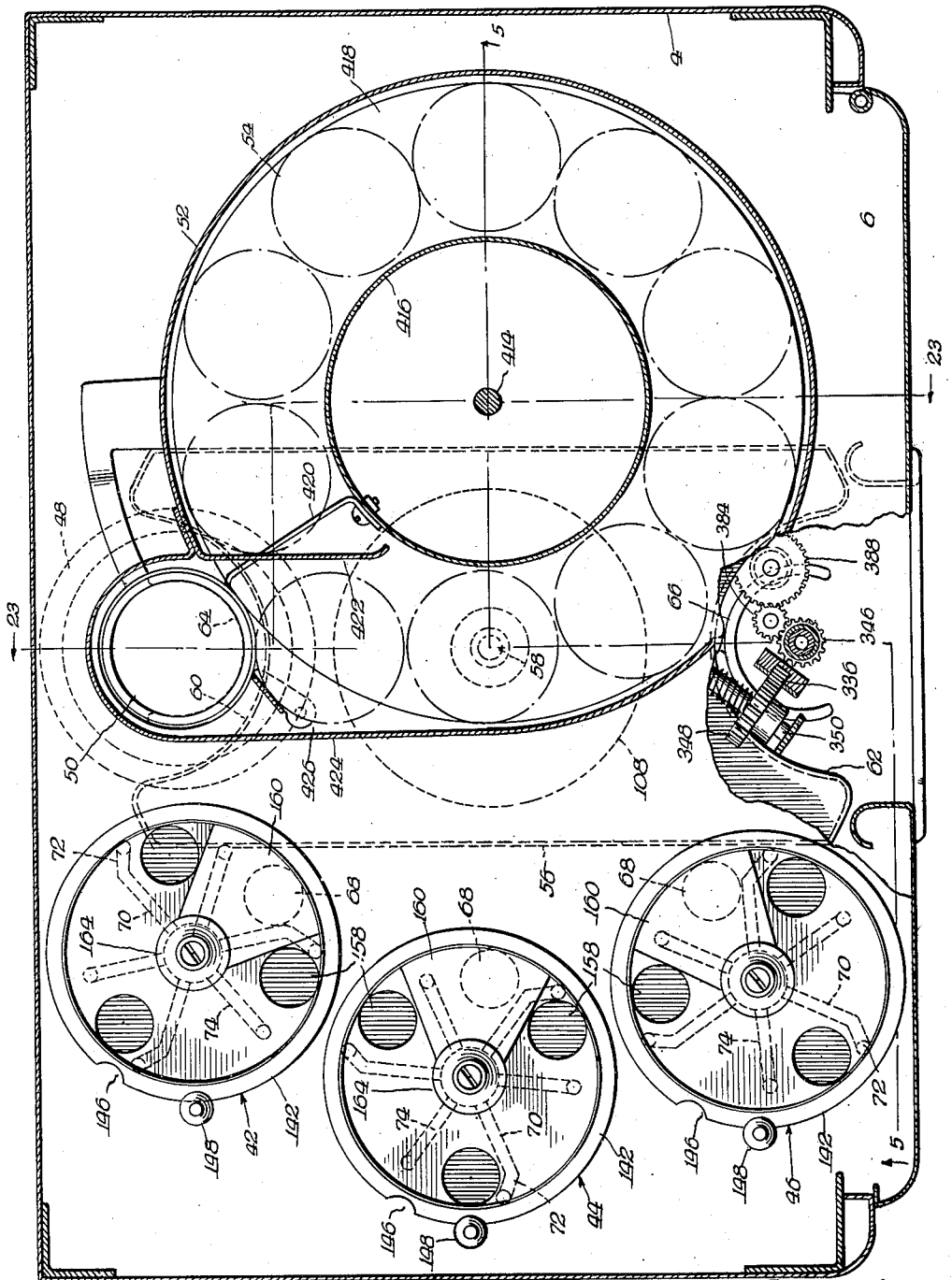
Fig. 4 is a horizontal sectional view, with parts broken away to show details, and taken substantially along the plane of line 4—4 of Figs. 1 and 5.

In Figs. 4 and 36 it will be seen that the cup stack magazine, indicated generally at 52, may comprise a rotatable shelf 412 adjacent the bottom thereof which is welded or otherwise secured to the upwardly extending shaft 414. The cup stack magazine is generally tubular in shape and an inner tubular member 416 is mounted on the shelf 412 for rotation therewith, and extends concentrically within the body of the magazine, to thereby provide a circular passage 418 wherein a plurality of cup stacks may be located. A pusher arm or support 420 is secured to the tubular member 416 and extends radially outwardly therefrom to aid in moving all of the cup stacks toward the outlet after a previous cup stack has been depleted. A baffle 422 is located adjacent one side of the magazine in substantial parallelism with an outwardly extending portion 424 of the magazine to thereby provide an outlet passage 426. When a cup stack has been depleted, suitable mechanism is provided to cause a rotation of the shelf 412 and the inner tubular member 416 which will carry the next succeeding cup stack through the passage 426 and deposit within the cup dispenser 48.

The mechanism which dispenses the individual cups and which effects the deposit of the next succeeding cup stack into the cup dispenser includes a sleeve 428 keyed to the lower end of the shaft 414, the upper end of which has an annular flange 430 thereon secured to the underside of the shelf 412. A keying pin 432 positively connects the upper end of the sleeve 428 to the shaft 414 to insure that a rotation of the shaft will carry with it the shelf 412 and the cup stacks mounted thereon. Another sleeve 434 is keyed to the sleeve 428 and has mounted thereon a disc 436, an arm 438 and a ratchet wheel 440. The disc 436 and arm 438 are both loosely mounted on the sleeve 434, but the ratchet wheel 440 is secured directly thereto, so that any rotary movement of said ratchet wheel will carry with it the shelf 412.

The disc 436 is utilized to dispense an individual cup from the cup dispenser 48 at the end of each cycle of the machine. Means are also provided on this disc 436 for the purpose of effecting a delivery of a cup stack to the cup dispenser. The disc itself is illustrated in Fig. 37 and is provided with a pair of opposing downwardly extending brackets 442 and 444 connected together by means of the support 446. These brackets carry cam rollers 448 and 450 between which the previously referred to cam 216 is adapted to rotate. The cam 216 is mounted on the vertical shaft 58 and the relationship between these various parts of the machine may be more clearly understood by reference to Fig. 3. The disc 436 is loosely mounted for rotation about the shaft 414 and a rotary movement of the cam 216 will thereupon impart a reciprocating movement to the disc 436. The edge of this disc may be provided at one side with a cut-out portion 452 and at another side with a slot 454. Referring momentarily to Figs. 34, 35, 36 and 40, it will be seen that this slot 454 is adapted to receive a pin 456 extending downwardly from the underside of a dog 458, having a stationary pivot 460 on the underside of the shelf 144. The outer end of the dog 458 is turned downwardly and is bifurcated as at 462 for the purpose of receiving the actuating arm 464 of the cup dispenser 48.

The cup dispenser operates in a manner well known to those skilled in the art and the details thereof need not be discussed at the present time. It is sufficient to say, however, that a cup will be dispensed therefrom by a movement of the arm 464 from its position shown in Fig. 35 to the position shown in Fig. 34. The position shown in Fig. 34 is that which the arm assumes at the end of the machine cycle, where it has just dispensed a cup. During the first half cycle of the machine, the cam 216 will rotate a one-half revolution, whereupon it will rotate the disc 436 carrying with it the dog 458 and the arm 464 to the position of these various parts as shown in Fig. 35. During the last half of the machine cycle, the cam 216 will continue its rotation and will rotate the disc 436 by bearing against the cam roller 448, whereupon the dog 458 will carry the arm 464 back to its original position shown in Fig. 34, at which time the cup dispenser will thereby be actuated to deposit a cup into the receiver therefor at one end of the cup carriage 56.

The opposite side of the disc 436 has a driving pawl 466 pivotally secured thereto by means of the pivot pin 468. One end of the pawl 466 is turned downwardly as at 470 and may be received within a slot 472 extending inwardly from the periphery of the disc 436. The manner in which the pawl 466 operates to drive the ratchet wheel 440 at a suitable time to deliver a subsequent cup stack will become apparent when the ratchet wheel itself is described.

The arm or empty cup locking member 438, which is disposed immediately below the disc 436, is illustrated per se in Fig. 39 and comprises an enlarged portion or mash 474 having an arcuate edge thereon provided with spaced notches 476 and 478. One edge of this enlarged portion is provided with a stop member 480 and the other edge has an outwardly extending finger 482 which may be grasped by a man servicing the machine or other person to manually rotate the arm 438 and reset the machine as described hereinafter. The opposite end of the arm has a testing finger 484 extending outwardly therefrom and adapted to be normally in contact with the cups in a cup stack located within the cup dispenser 48. A small coiled spring 486 normally urges the testing finger 484 against the cups so that when a cup stack has been depleted, or so much so that the cups have fallen below the level of the finger 484, the arm 438 will be rotated about the shaft 414 on which it is mounted, to the position shown in Fig. 40. In this position the driving pawl 466 will be permitted to engage the teeth or notches 488 on the ratchet wheel 440 for the purpose of rotating this wheel and delivering another cup stack to the cup dispenser.

The manner in which a single cup is dispensed during each cycle of the machine has been explained above. During each cycle of the machine the disc 436 will be caused to have a rotary reciprocation. During each rotary movement of the disc 436 the pawl 466 will be carried with it and will also be reciprocated. The arm 438 is so positioned with respect to the disc 436 that the notch 476 therein may normally be in register with a similar notch 488 in the ratchet wheel 440 as illustrated in Fig. 34. The arcuate portion of the mask between the two notches 476 and 478 on the arm 438 is of a sufficient length to normally cover several of the notches 488 adjacent the one next to the finger 482. This portion of the periphery, in other words, will mask several of the notches in the ratchet wheel. During a cycle of the machine when the arm 438 remains in its position shown in Figs. 34 and 35, and while the disc 436 is moved from its position in Fig. 34 to its position in Fig. 35, the driving pawl 466 will be cammed outwardly by means of the angular portion of the slot 476, and will be held in such outermost position by its contact with the masking portion 474 of the arm. This is illustrated in Fig. 35.

When the disc 436 is rotated in a clockwise direction back to its original position, the pawl 466 will be carried therewith and will again come to rest within the slot 472 and a notch 488. If, however, a cup stack has been depleted, or enough of the cups have been dispensed therefrom to permit the arm 438 to be moved in a counterclockwise direction to its position shown in Fig. 40, then this will bring the notch 476 therein in alignment with the next adjacent notch 488, also shown in Fig. 40. The next rotary movement of the disc 436 will carry with it the pawl 466 and will then permit the end 470 thereof to be received within said adjacent notch in the ratchet wheel 440. When the disc 436 is then returned to its normal position, the ratchet wheel will be caused to rotate a distance equal to the width of one notch, such rotation thereof also carrying with it a rotation of the shelf 412 within the cup stack magazine as well as the cup stacks themselves.

The weight of the mechanism is such that it would ordinarily be too much of a shock to attempt to rotate the ratchet wheel in a single movement thereof a sufficient distance to move the next succeeding cup stack to the cup dispenser. It has, therefore, been found advisable to move the cup stacks a short distance each time so that perhaps two or three notches of the ratchet wheel should be contacted in succession. If the movement of the ratchet wheel through a distance of one notch is not sufficient to bring the next succeeding cup stack into position above the cup dispenser, then the next rotary reciprocation of the disc 436 will again carry with it the pawl 466 which will then be received within another notch and will thereby cause the ratchet wheel to rotate again. It will be noted that the slot 472 will permit the pawl 466 to be received within the notch 476 in the arm 438, whereby said arm will be moved with the disc 436 in its rotary reciprocating movement each time a cup stack is not present to prevent inward movement of said arm. When the ratchet wheel 440 has moved a sufficient distance to deliver the next succeeding cup stack to the cup dispenser, the testing finger 484 will again be held outwardly in its position shown in Figs. 34 and 35 during the dispensing of the complete stack. During this dispensing period, each reciprocation of the disc 436 will carry the pawl 466 forwardly and backwardly without having any effect on the ratchet wheel 440. As soon as this cup stack becomes depleted however, the arm 438 will be moved to permit the pawl 466 to contact a notch in the ratchet wheel and cause its rotation.

The notches in the ratchet wheel are so determined that the ratchet wheel will rotate one full revolution or less to deplete the supply of cup stacks, and when the last cup stack has been depleted without more cups being supplied to the magazine, it is necessary that the machine become inoperative because there will be no receptacles in which the beverage may be mixed. To provide for this contingency, a deeper notch 490 is provided at a suitable location in the periphery of the ratchet wheel 449, which is adapted to receive a pawl 492 pivotally mounted at 494 for the purpose of opening a switch 496 to render the entire machine inoperative. This empty cup switch 496 is provided with a blade 498 which may have a predetermined amount of flexing movement while remaining closed. The pawl 492 is positioned adjacent the blade 498 and normally holds the switch in closed position. This is true whether the pawl be within one of the notches 488 as shown in Figs. 35 and 40, or whether it be against the outermost periphery of the ratchet wheel as shown in Fig. 34.

The second notch 478 of the arm 438 becomes important at this time, and during ordinary operation of the machine when the ratchet wheel 448 is being rotated to supply a new cup stack to the cup dispenser, the blade 498 will be flexed inwardly and outwardly by movement of the pawl 492 as each succeeding notch passes. However, after the last cup stack has been depleted and the arm 438 has been moved to its position shown in Fig. 40, the deep notch 490 in the periphery of the ratchet wheel 449 will then reach a position opposite the pawl 492 as shown in Fig. 42. The notch 478 in the arm 438 is of sufficient depth to permit the pawl 492 to be received within the deep notch 490. This will permit the blade 498 to be moved outwardly a sufficient distance to open the empty cup switch 496 and thus break the electrical circuits in the machine and prevent operation thereof regardless of whether an acceptable coin is deposited or any of the external controls are actuated.

When this condition occurs, or if at any intermediate time a service man desires to supply the cup magazine with additional cup stacks, it is necessary to reset and position the deep notch 490 in such a way that it will not again reach the pawl 492 until the last cup stack has been depleted. When this is to be done, the service man may grasp the finger 482 on the arm 438 and move the arm slightly in a clockwise direction, and such movement will be limited by the stop member 439 coming against the downturned end 500 of the pawl 492. This movement of the arm 438 will also remove the end 470 of the pawl 466 from the path of the notches in the ratchet wheel 449, whereupon the ratchet wheel may be rotated in a counter-clockwise direction to return the various parts, including the shelf 412 and pusher arm 420, back to their normal positions. Upon release of the finger 482, the spring 486 will urge the arm back to its normal position where the testing finger 484 will again normally bear against a cup stack located within the cup dispenser.

*The waste cup withdrawal means*

It has already been explained above that the machine is provided with a waste receptacle 36 wherein a customer may deposit a used cup. It may occasionally happen, however, due to the construction of the present machine, that a customer may become curious, or for some other reason, may deliberately replace a used or partially filled cup into the cup carriage receiver at the front of the machine and again cycle the machine to see what would happen to the used cup. If carried on long enough, this procedure could result in a jamming of the machine and a possible dispensing of the beverage ingredients elsewhere than into the receptacle or cup. It is, therefore, necessary to provide withdrawal means to prevent the replaced cup from reaching a position at the back of the machine where the next succeeding cup from the cup stack may be dispensed therein.

Figs. 43, 44 and 45 illustrate a novel and preferred means for automatically withdrawing any cup remaining in one of the cup receivers as it moves from the front to the rear of the machine during the first half cycle thereof. It will be remembered that during the first half of the cycle a cup is in place in the cup carriage 56 at the rear of the machine. This cup carriage rotates through a one-half revolution whereupon the cup passes adjacent each of the powder dispensers to receive therein the selected beverage ingredients. During this time the empty receiver at the front of the machine will be moved to the rear where it will receive the next succeeding cup and be in readiness for the next cycle.

In the figures relating to this phase of the invention, the cup carriage 56 has been illustrated with the cup receiver 64 having a cup 410 therein which has been replaced by a customer after use. The waste cup removal mechanism is located at one side of the machine as illustrated in Fig. 3 and includes a downwardly extending supporting rod 502 having an outwardly extending support 504. A tubular member 506 is rotatably mounted within the end of the support 504 and is adapted to receive a pin 508 around which a coiled torsion spring 510 is located adapted to normally maintain the device in its position as shown in Fig. 43.

A finger 512 extends outwardly from the tubular member 506 and has spaced collars 514 and 516 positioned at its outer end, between which are located a coiled torsion spring 518 having one end thereof secured to the collar 516, so that the downwardly extending pin 520 mounted thereon is normally maintained in its downward position. The pin 520, however, may be flexed or moved upwardly against the torsion of the spring 518, but will immediately return to its downward position when free to do so.

An elongated curved arm 522 extends outwardly from the other side of the tubular member 506 and is adapted to be contacted by an upwardly extending pin 524 adjacent one corner of the cup carriage 56.

This constitutes the structure of the cup withdrawal means and it operates in the following manner to withdraw a cup which has been replaced within the cup receiver 64 at the front of the machine. As the cup carriage 56 rotates, the receiver 64 and cup 410 therein will brush against the pin 520 to first move it upwardly and then permit it to return to its normal downward position within the cup. After the pin 520 is located within the cup, the pin 524 on the cup carriage 56 will then contact the curved outer end of the arm 522 to thus rotate the tubular member 506 and arm 512 connected thereto. The pin 520 can not be flexed in the opposite direction, and as the arm 522 continues to rotate carrying with it the arm 512, the downwardly extending pin 520 will bear against the inner side of the cup 410 and forcibly withdraw the cup from its receiver 64.

This action of the withdrawal means will, of course, take place during each cycle of the machine, but will have no effect unless a used cup has been placed in the cup receiver at the front of the machine. The dotted line position of this mechanism in Fig. 44 illustrates the maximum movement thereof to assure that a cup 410 will be completely withdrawn from its receiver. This will insure that when either of the two cup receivers returns to the rear of the machine, it will be empty and free to receive the next succeeding cup from the cup stack.

*The full stroke switch*

As will become more apparent upon a consideration of the wiring diagram, the machine is provided with a full stroke switch to assure the customer that the only event which will prevent him from receiving a beverage for which he has paid, will be a complete power failure. The full stroke switch is provided so that a deposit of any further coins or any actuation of the external controls during operation of the machine will not interfere therewith.

Referring more particularly to Figs. 46, 47 and 48, there is illustrated an enlarged view of the pinion 184 and driving gear 186 which is designed to complete one revolution during a cycle of the machine. It will here be noted that the gear 186 is locked in position on the stub shaft 188 by means of a C-lock washer 526, and the assembly of gears is secured to the bracket 190 by means of the bolt 528. An arcuate cam or shoe 530 is secured to the face of the gear 186 by any suitable means such as the screws 532 and 534, which shoe is approximately semi-circular and covers about one-half of the gear face.

A smaller camming member 536 is located adjacent one end of the shoe 530, which is the member which controls the actuation of the full stroke switch 538 mounted adjacent thereto. A second switch 540 is also located adjacent the full stroke switch which, as will be explained more fully hereinafter, is actuated to begin operation of the motor 408 for rotating the plunger of the mixing device.

The full stroke switch 538 is a double pole switch having an outwardly extending blade 542 adapted to be contacted by the cam 536. The blade 542 is normally in the position shown in Fig. 46 which closes a circuit through the motor 38 after an acceptable coin has been deposited and any one of the external controls has been actuated. As soon as the machine begins its cycle by operation of the motor 38, the gear 186 will begin to rotate in a counter-clockwise direction. Immediately after such rotation begins, the cam 536 will have been moved out of the path of the switch blade 542 thus permitting it to spring downwardly against the other pole of the switch whereupon the motor 38 will then be connected directly across the power lines. The motor 38 will then be operating independently of any other switches and regardless of the depositing of any coins or the actuation of any of the external controls, the operation of the motor 38 will not be disturbed as long as the blade 542 is in its downward position.

After the gear 186 has completed a full revolution, the cam 536 will be returned to its normal position whereupon it will contact the end of the blade 542, moving it back to its normal or up position. At this time the circuit to the motor 38 will be broken, due to the previous opening of other switches in the circuit. Thus, the cycle of the machine will be completed and the motor 38 will stop at the end of a complete revolution of the gear 186.

The shoe 530 controls the actuation of the double pole switch 540 connected to the mixing motor 408 by contacting the blade 544 thereof. It was explained during the description of the mixing device that it was unnecessary to begin rotation of the plunger 316 until approximately the first half cycle of the machine had been completed. The mixing motor 408 is connected directly across the power lines by movement of the blade 544 from its normal down position to its upper position against the other pole of the switch. This movement of the blade 544 occurs when the end thereof is contacted by the shoe 530. The operation of this phase of the invention will also become more apparent during the discussion of the wiring diagram, but for the present it may be sufficient to state that the shoe 530 is carried by the gear 186, and as this gear rotates in a counter-clockwise direction, the end of the shoe 530 will contact the blade 544 after a substantially one-half revolution thereof has been completed.

By this time the cup or receptacle with the beverage ingredients therein has been moved to its position at the front of the machine and beneath the plunger 316. The blade 544 will remain in the position to which it was moved by the shoe 530 for substantially the last half of the cycle of the machine, during which time the motor 408 will be energized and the plunger 316 will be rotated. After a full revolution of the gear 186 has been completed, then the other end of the shoe 530 will reach the blade 544 and will pass the blade to thereby permit it to return to its normal position which breaks the circuit to the motor 408. The full stroke switch, then, is actuated by the cam 536 to connect the driving motor across the power lines for full cycling of the machine, and the switch 540 is actuated by the shoe 530 after a half cycle of the machine to start the motor 408 and rotate the plunger 316.

*The electric circuit*

The schematic wiring diagram shown in Fig. 49 illustrates the various circuits of the machine, and an attempt has been made, insofar as possible, to also illustrate diagrammatically some of the mechanical parts of the machine, to show their relative positions. For example, the powder dispensers or containers 42, 44 and 46 are illustrated adjacent the cup carriage 56 which carries the contact shoes 112, 114, 116 and 118. Also, the normally energized contact posts 100 and 102 are illustrated in their relative positions to the contact shoes on the cup carriage, as well as the other contact posts 98 and 104, which are selectively energized depending upon the type of beverage ingredient chosen by the customer.

Various additional features not heretofore discussed are also illustrated herein such as the display lamp 546 and the coin return solenoid 548. Other lamps are also present and have definite functions relative to the operation of the machine, as will appear hereinafter. It is a well known expedient to have an arm within the coin mechanism chute to divert and return a coin to the customer which may be deposited either during the cycling of the machine, when the power supply has failed, or when the cup magazine is empty. The coin return solenoid 548 is normally energized to thereby withdraw any such diverting arm from the coin chute. De-energization of the solenoid 548 will immediately cause the arm connected thereto to position itself within the coin chute to divert a deposited coin to a return coin chute and back to the customer. One form which this mechanism may take is illustrated in the Thompson and Doggett Patent No. 2,376,403, and forms no part of the present invention.

The display lamp 546 is also normally on but is in a circuit which is de-energized during the operation of the machine to show that the machine is cycling. The power lines may be indicated as L-1 and L-2, and during periods when the machine is not in operation, the circuit from one side of the line L-1 may be traced through the branches 550, 552, 554, 556 and 558 to both the coin return solenoid 548 and the display lamp 546 which are connected in parallel. The current then returns to the opposite side of the line through the branches 560 and 562 through the empty cup switch 496, the branch 564, the holding relay switch 566, the branches 568, 570, 572 and 574, through the switch 540 and the branch 576 to the lead-in line L-2. It will thus be evident that the display lamp 546 and coin return solenoid 548 are normally energized so that the display lamp will be on and a coin will be delivered through a coin chute.

A coin trip switch 578 is provided which is normally open but will be momentarily closed during the passage of a coin through the coin chute, after it has been accepted by any suitable scavenger means. As soon as the coin trip switch 578 is closed, the holding relay solenoid 580 will become energized to close the switch 566 and move the blade thereof to its dotted line position shown in Fig. 49. The current through the solenoid 580 may be traced similarly from one side of the line L-1 through the branches 550, 552, 554 and 556 to the branch 582, where the current then continues through the solenoid 580 and back through the branches 584 and 586, through the closed coin trip switch 578 and branch 588, where it returns to the other side of the line L-2 through the branches 568, 570, 572, 574 and 576.

The coin trip switch 578 is closed only momentarily, and as soon as the solenoid 580 has become energized, as just explained, and closes the switch 566, the coin trip switch 578 is immediately opened and the current from one side of the line through branch 556 to the other side of the line through branch 568 will then be carried through the solenoid 580 and the closed switch 566. It will be clear that when the blade of switch 566 has been moved by energization of the solenoid 580, it will break the circuit through the display lamp 546 and the coin return solenoid 548. The coin return solenoid will then be de-energized and any further deposited coins will be returned to the customer. The breaking of this circuit also breaks the circuit through the empty cup switch 496, but the switch itself will not be opened, as has been explained above during the description of the cup dispensing means.

The depositing of a coin, then, will place the machine in readiness to cycle after a choice has been made by the customer and he has actuated one of the external controls 16, 18, 20 or 22. Also at this time an indicating lamp 590 behind the controls is caused to light the controls and direct the customer's attention thereto. This lamp also indicates that an acceptable coin has been deposited, and that the machine is ready to cycle when a choice has been made. The circuit through the lamp 590 may be traced from one side of the line L-1 through the branches 550, 552, 554, 556 and 558 to the other side of the line through the branches 592 and 594, thence through the branches 586 and 584, through the switch 566 and the branches 568, 570, 572, 574 and 576. Thus, the depositing of a coin which energizes the solenoid 580 and closes the switch 566 will not only energize the necessary circuits for cycling the machine, but will also cause the indicating lamp 590 to become lighted indicating that the machine is ready.

Each of the external controls 16, 18, 20 and 22 has associated therewith the respective relay solenoids 596, 598, 600 and 602. When the switch 566 is closed, and one of the controls is actuated, the relay solenoid associated therewith causes a plurality of switches to close to energize circuits through the motor 38 and through the selector means. During the description of the selector means it was pointed out that the contact posts 100 and 102 were continually energized and that a selection of particular beverage ingredients would energize either or both of the contact posts 98 and 104. The various circuits to be energized upon the actuation of an external control will now be described and for purposes of illustration, it may be assumed that the customer desires black coffee, which would indicate that both of the contact posts 98 and 104 would be energized, whereupon neither the sugar nor the cream in containers 42 and 46 would be dispensed.

Upon actuation of the external control 16, its switch will be closed to energize the relay solenoid 596. This particular solenoid has in association therewith the switches 604, 606, 608, and 610, all of which will be moved to their closed positions when the solenoid 596 is energized. In energizing the solenoid 596, current will pass from one side of the line through the branch 556 and the branch 612 to the solenoid and will return to the other side of the line through the branches 614, 592, 594, and 586, through the switch 566 and the branch 568. As soon as this solenoid 596 has been energized, the control or switch 16 may be released, but the solenoid will remain energized because of the closing of switch 604, which then carries the current from one side of the line through branch 556 and branch 612 to the solenoid 596 and to the other side of the line through branches 616, 618 and 620, through the switch 566, and branch 568. Any further actuation of this or any other external control will then have no further effect on the operation of the machine.

When the solenoid 596 is energized, the switch 606 will also be closed to its dotted line position to energize the contact post 104 through the circuit branches 622, 624, 626, 628 and 630. The switch 610 will also be closed when the solenoid 596 is energized, whereupon the other contact post 98 will become energized through the branches of the electric circuit indicated at 632, 634, 636, 638, 640 and 642.

The contact posts 100 and 102 are normally energized by being connected directly to that side of the line indicated as L-1, and current will pass from the branches 550, 552 and 554 to these contact posts through the branches 644, 646, 648, 650 and 652. In order to complete the circuit, when either or both of the contact posts 98 or 104 is energized, the current must come from the other side of the line L-2. It has been explained that current is supplied to the contact post 98 through the closing of switch 610, which flows through the branches 642, 618 and 620 through the switch 566 and the branch 568 back to the other side of the line. The current follows the same course when the contact post 104 is energized through the closing of switch 606.

When the motor 38 begins to rotate the cup carriage 56, the shoe 112 will contact the post 100 and the shoe 116 will contact the post 98. The shoe 112 is connected through one side of the solenoid 90 and the shoe 116 is connected to the other side of the solenoid 90. Current will then pass from one side of the line to the contact post 100, through the solenoid 90 and back to the other contact post 98, whereupon the solenoid 90 will be energized and the selector arms 76 and 78 will be withdrawn from their normal outward position so that they will be unable to actuate the dispensing mechanism associated with the container 42. When the cup carriage reaches the position where the shoe 112 contacts the post 104 and the shoe 116 contacts the post 102, the solenoid 90 will again be energized to withdraw the selector arms and thus prevent any of the beverage ingredient from the container 46 from being dispensed. Thus, the only ingredient deposited in the receptacle will be the coffee contained in the dispenser 44 resulting in a cup of black coffee.

The switch 608 associated with the relay solenoid 596 is the motor switch which actuates the motor 38. When this relay solenoid is energized, the blade of switch 608 will be moved to its dotted line position shown in Fig. 49, connecting together the branches 618 and 662. From the line L-1 the current will then pass through the motor 38 and the branch 654, through the switch 538 to the branches 656, 658 and 660 to the branch 662 and through the switch 608 back to the other side of the line through the branches 618 and 620, and the switch 566. It will thus be clear that actuation of the push button 16 will energize the solenoid 596 to close the switches 604, 606, 608 and 610. The switch 604 maintains the solenoid 596 energized. The switches 606 and 610 energize the respective contact posts 104 and 98, and the switch 608 will begin operation of the motor 38.

It has also been explained that the blade of switch 538 is immediately moved to the opposite contact as shown in the dotted line position in Fig. 49 after the gear 186 has begun to rotate. The small cam 536 is shown somewhat diagrammatically in Fig. 49 and it will be seen that rotation of the gear 186 will permit the blade of switch 538 to be moved to its dotted line position, whereupon the motor 38 will be connected directly across the lines L-1 and L-2. The current will then pass from one side of the line L-1 through the motor 38, and branch 654, through the switch 538 and branch 664 to the other side of the line L-2 through the branch 576.

As soon as the motor has begun its operation and the blade of switch 538 has been moved to its dotted line position, the safety lamp 666 will become lighted to indicate that the machine is in operation. It will be apparent that closing of the switch 538 will energize the lamp 666 by current passing from one side of the line L-1 through the branches 550, 552, 554, 556 and 558 through the lamp and directly back to the other side of the line L-2 through the branch 668 and the switch 538. The safety lamp 666 may preferably be a red light to indicate danger, and the customer should not place his hand through the opening at the front of the cabinet. During the first half cycle, the cup carriage will be rotating, and during the last half cycle, the hot water is being dispensed.

The mixing motor 408 is also actuated during the last half cycle of the machine to rotate the plunger 316 in the mixing device. This motor 408 is connected to one side of the line L-1 by means of the branch 670 and to the other side of the line L-2 through the branch 672. The switch 540 is normally in a position to close the circuit through the holding relay switch 566 so that the motor 408 is normally inoperative. After the motor 38 has rotated the gear 186 through substantially a one-half revolution, the shoe 530 thereon will then contact the blade of switch 540 to move it to its other pole as indicated by the dotted line position thereof in Fig. 49. This operation occurs after the selected beverage ingredients have been deposited into the mixing zone so that there is no longer any reason for the holding relay switch 566 to maintain the solenoid 580 energized. The movement of the blade of the switch 540 to the other pole will thereupon de-energize the holding relay solenoid 580 to permit the blade of switch 566 to return to its normal position, and will also connect the mixing motor across the lines L-1 and L-2 for operation thereof. The motor 408 will then rotate the plunger 316 of the mixing device for substantially the last half cycle of the machine, including the period during which the liquid is being dispensed through the orifices therein. After the machine has completed its cycle the shoe 530 will have passed the blade of switch 540 to thereby permit it to return to its normal position and stop further operation of the motor 408. At this time the various circuits of the machine will be in their normal condition as indicated in Fig. 49 thereupon resetting the machine for the next cycle.

A cup compartment lamp 674 is also connected in parallel with the display lamp 546 and will be normally lighted when the machine is not in operation. This will become apparent when it is noted that the lamp 674 is connected directly across the lines 558 and 560. It has been stated hereinabove that the location and sequence of operation of the display lamp 546, indicating lamp 590, safety lamp 666 and cup compartment lamp 674 is an important consideration from the standpoint of operation of the machine and the merchandising effect upon prospective customers. This phase of the invention, however, will be dealt with in more detail during the description of the operation of the machine.

Thus far, the wiring diagram of Fig. 49 has been described with respect to the actuation of the external control 16 where it was observed that the closing of switches 606 and 610 energized the contact posts 104 and 98, respectively, for the purpose of energizing the solenoid 90 to withdraw the selector arms 76 and 78 as the cup carriage passes the sugar container 42 and the cream container 46. This operation will then produce a cup of black coffee. In the arrangement illustrated, the actuation of the external control 18 is adapted to produce a cup of coffee containing cream only and this operation may be briefly described by directing attention to the line 676 which connects the control 18 with the relay solenoid 598 associated therewith. Actuation of the control 18, after the deposit of an acceptable coin which prepares certain electrical circuits for cycling the machine, will energize the solenoid 598 by connecting it to one side of the line through the branch 676 and to the other side of the line through the branch 556. Upon energizing the solenoid 598, the three switches 678, 680 and 682 will all be moved to closed position. The switch 678 is the holding switch which maintains the holding solenoid 598 energized and performs the same function as the previously described switch 604. The switch 680 is the motor switch which energizes the motor 38 and begins operation of the machine, and the switch 682 will be connected across the lines by means of the branch 684 to energize the contact post 98 adjacent the sugar container 42. It will be noted that there is no circuit connected with the control 18 for energizing the contact post 104, so that, as the cup carriage 56 rotates, the selector arms 76 and 78 thereon will be withdrawn at the time they pass the sugar container 42 but will remain in their extended position during the remainder of the cycle whereupon both of the beverage ingredients, coffee and cream, will be dispensed from the containers 44 and 46.

Control 20 is designed to produce a cup of black coffee with sugar only, and the switch associated therewith will energize the solenoid 600 through the line 686. The operation for this particular selection will be the same as those previously described, except that the selector arms will be caused to be withdrawn only at the time they pass the cream container 46, leaving them extended as they pass the sugar and coffee containers 42 and 44, so that those ingredients will be dispensed. Upon actuating the control 20, the solenoid 600 will be energized to close the three switches 688, 690 and 692 associated therewith. The switch 688 is the one which maintains the solenoid 600 energized after release of the control 20, while the switch 690 actuates the motor 38, and the switch 692 will energize the contact post 104. Thus, actuation of control 20 will produce a cup of black coffee with sugar.

Control 22 is so connected into the circuits as to produce a cup of coffee containing both sugar and cream. This operation is the most simple because the selector arms 76 and 78 will be permitted to remain in their normal extended position throughout the entire cycle of the machine to actuate the dispensing means associated with all of the containers 42, 44 and 46. It is, therefore, unnecessary to energize either of the contact posts 98 or 104. The relay solenoid 602 associated with the control 22 will become energized upon actuation thereof through the line 694, whereupon the holding switch 696 and motor switch 698 will be closed. The operation of the other parts, including the two motors 38 and 408, and the movement of the switches which control the operation of the machine, will be identical during each cycling thereof, the only difference in operation being with respect to the actuation of the selector means. From the foregoing it will be apparent that actuation of a selected external control, after the deposit of an acceptable coin, will deliver to the customer a beverage containing one or more of the beverage ingredients in the containers 42, 44 and 46.

*Operation of the machine*

As a customer approaches the machine, the display lamp 546 and the cup compartment lamp 674 will be lighted, and the coin return solenoid 548 will be energized so that an acceptable coin will be free to pass through the coin chute and close the switch 578. The display lamp 546 is utilized for the purpose of lighting the subject matter contained on the upper panel at the front of the machine, such as the name of a company or other advertising matter. This immediately directs the customer's attention to the machine itself. The cup compartment lamp 674 is so located within the machine as to light the compartment 12 at the front thereof.

The customer may, if he desires, attempt to actuate any one or more of the external controls 16, 18, 20 or 22 prior to depositing an acceptable coin in the slot 10. This, however, will have no effect on the machine because the circuits through these controls depend upon the closing of the switch 566 by energizing the holding relay solenoid 580. The customer may then deposit his coin, which will actuate the coin trip switch 578 to energize the holding relay solenoid 580 and move the blade of switch 566 to its dotted line position, and place the machine in readiness for operation after the customer has decided on a particular beverage and has actuated the selected control.

The closing of switch 566 will then cause the indicating lamp 590 to light, and the display lamp 546 as well as the cup compartment lamp 674 will be de-energized. The indicating lamp 590 is positioned behind the external controls, each of which may have associated therewith suitable indicia to indicate which beverage will be produced by the actuation of a particular control. The customer's attention will thereupon be directed to the particular beverages which the machine has to offer and away from the subject matter on the front panel thereof. The customer then makes his selection and actuates the selected external control, whereupon the machine will proceed to cycle and produce the desired beverage.

As soon as one of the controls has been actuated, however, the customer's attention need be no longer directed to the merchandise of the machine, and the indicating lamp will then be de-energized. However, the actuation of the control will immediately light the safety lamp 666, which may be a red light, to indicate that the machine is cycling. This red light will also act as a warning to the customer not to place his hand within the cup compartment because the cup carriage has then begun to rotate and pick up the selected beverage ingredients during the first half cycle of the machine. The safety lamp stays on until after the hot water has been delivered to the mixing zone and the beverage is completed. Also during the first half cycle of the machine several other events are taking place besides the dispensing of the selected ingredients into the mixing zone. The rotation of the gear 186 through the cam 536 thereon will first connect the operating motor 38 directly across the power lines to insure that the cycle of the machine will be completed. At the same time the liquid supply means illustrated in Figs. 21 and 22 will come into operation whereupon the piston rod 252 will move downwardly to draw a quantity of hot liquid into the cylinder 248 and simultaneously supply a like amount of liquid at ordinary temperature to the tank 30 from the cylinder 246. This first half cycle also rotates the disc 436 by means of the cam 216 (see Fig. 34) whereupon the dog 458 will actuate the cup dispenser arm 464, in readiness to deposit another cup into the receiver on the cup carriage 56. If a previous customer has replaced a used cup into the receiver at the front of the machine, the first half cycle of the machine will also remove this used cup in accordance with the operation of the cup withdrawal means illustrated in Figs. 43, 44 and 45.

At the end of the first half cycle the selected beverage ingredients will have been dispensed into the mixing zone, such as a cup 410, whereupon the cup will come to rest at the front of the machine and below the mixing device illustrated in Figs. 25 through 33. During the last half cycle of the machine the switch 540 will be actuated to de-energize the holding relay solenoid 580 and will open all of the switches associated with the relay solenoid of any selected external control. At this time the movement of the blade of the switch 540 will cause the mixing motor 408 to become energized for the purpose of rapidly rotating the plunger 316 of the mixing device. This plunger will also begin its downward movement and when it reaches its lowermost position the openings 318 therein will come into register with the passage 312 to receive the hot liquid being forced therethrough. This liquid is introduced into the mixing device, also during the last half cycle of the machine, by upward movement of the piston rod 252 (see Fig. 21) which forces the hot liquid in the cylinder 248, and which has just been withdrawn from the tank 30, through the conduit 306. Simultaneous with this movement the piston within the cylinder 246 will act to withdraw a quantity of liquid at ordinary temperatures from the tank 26 through the conduit 294.

At the end of the cycling, when the mixing operation has been completed, the blade of switch 540 will be returned to its normal position and the cam 536 will close the switch 538, whereupon both of the motors 38 and 408 will become inoperative. Also at this time the closing of switch 538 will light the display lamp 546 and cup compartment lamp 674. The cup compartment lamp will then direct the customer's attention to the cup compartment to indicate to him that the beverage which he has selected is now ready for removal from the machine.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

Having thus described my invention what I claim as new and desire to secure by Letters Patent of the United States:

1. In a selective beverage vending machine, a plurality of containers each adapted to contain and have dispensed therefrom a quantity of at least one beverage ingredient in finely divided solid form, a mixing zone, a plurality of external controls, electric selective means operable in response to actuation of a selected control to dispense at least one of said beverage ingredients into said mixing zone, and means to forcibly spray a liquid into said mixing zone to thereby thoroughly agitate and mix with the ingredient therein and form a beverage.

2. In a selective beverage vending machine, a plurality of supply means for beverage ingredients, a mixing zone, means for moving said mixing zone continuously past all of said supply means during a single cycle of the machine, a plurality of external controls, selector means operable upon actuation of a selected control for dispensing a selected beverage ingredient into said mixing zone while it is moving, and means for depositiing a liquid into said mixing zone to thereby form a beverage.

3. In a selective beverage vending machine, a plurality of supply means for beverage ingredients, a mixing zone, means for moving said mixing zone to successive positions adjacent said supply means, a plurality of external controls, electrically operated selector means operable upon actuation of a selected control for dispensing a selected beverage ingredient into said mixing zone during movement of the mixing zone past the selected supply means, and means for depositing a liquid into said mixing zone to thereby form a beverage.

4. In a selective beverage vending machine, a plurality of supply means for beverage ingredients, a mixing zone, means for moving said mixing zone to successive positions adjacent said supply means, a plurality of external controls, electrically operated selector means operable upon actuation of a selected control for dispensing one or more selected beverage ingredients into said mixing zone during movement thereof past the supply means for the selected ingredients, and means for depositing a liquid into said mixing zone to thereby form a beverage.

5. In a selective beverage vending machine having a plurality of supply means for beverage ingredients, and means for depositing a liquid into a receptacle for mixture with the ingredients to form a beverage, receptacle positioning mechanism comprising a movable carriage adapted to support a receptacle thereon, motive means for moving said carriage to position a receptacle thereon adjacent all of said supply means and to said liquid depositing means successively during a single cycle of the machine, electrically operated selector means, a plurality of external controls adapted to be selectively actuated and electric circuit means energizable upon the actuation of a selected control to actuate said motive means and said selector means, whereby one or more selected beverage ingredients will be dispensed into said receptacle as the receptacle is positioned adjacent the supply means therefor.

6. In a selective beverage vending machine having a plurality of supply means for beverage ingredients, and means for depositing a liquid into a receptacle for mixture with the ingredients to form a beverage, receptacle positioning mechanism comprising a movable carriage adapted to support a receptacle thereon, motive means for moving said carriage to position a receptacle thereon adjacent said supply means and to said liquid dispensing means successively during a single cycle of the machine, electrically operated selector means mounted on said carriage, a plurality of external controls adapted to be selectively actuated, and electric circuit means energizable upon the actuation of a selected control to acuate said motive means and said selector means, whereby one or more selected beverage ingredients will be dispensed into said receptacle as the receptacle is positioned adjacent successive supply means.

7. In a selective beverage vending machine, a plurality of containers each adapted to contain a quantity of at least one beverage ingredient in finely divided solid form, a mixing zone, means for moving said mixing zone to successive positions adjacent said containers, a plurality of external controls, electrically operated selector means operable upon actuation of some of said external controls to dispense beverage ingredients from a plurality of said containers into said mixing zone, and means for depositing a liquid into said mixing zone for forming a beverage.

8. A mixing device for a selective beverage vending machine having therein a plurality of containers adapted to contain and have dispensed therefrom a quantity of beverage ingredients, a mixing zone, a plurality of external controls, and means operable upon the actuation of a selected external control to deposit a selected beverage ingredient into said mixing zone, said mixing device being operable to deposit a liquid into said mixing zone and mix therewith to form a beverage, and including a reciprocable tubular plunger mounted for movement into and out of said mixing zone, said plunger adapted to pass liquid therethrough when within said mixing zone.

9. A mixing device for a selective beverage vending machine having therein a plurality of containers adapted to contain and have dispensed therefrom a quantity of beverage ingredients, a mixing zone, a plurality of external controls, and means operable upon the actuation of a selected external control to deposit a selected beverage ingredient into said mixing zone, said mixing device being operable to deposit a liquid into said mixing zone and mix therewith to form a beverage, and including a tubular plunger, means for moving said plunger into said mixing zone after the selected ingredient is dispensed therein, and means for spraying a quantity of liquid through said plunger and into said mixing zone, to thereby form a beverage.

10. Liquid supply means for use in a beverage vending machine, comprising two tanks, the first tank adapted to contain liquid at ordinary temperatures, and the second tank adapted to contain liquid at a controlled temperature, means for maintaining the liquid in said second tank at a predetermined temperature, means for withdrawing a quantity of liquid from said second tank sufficient to form a single drink and supplying simultaneously a like quantity of liquid at ordinary temperatures thereto, and means for simultaneously dispensing the liquid withdrawn from said second tank and withdrawing a like quantity of liquid from said first tank.

11. In a selective beverage vending machine, a plurality of containers for beverage ingredients capable of being mixed with a liquid to form a beverage, a mixing zone, a plurality of external controls, selector means operable upon actuation of an external control to dispense a selected beverage ingredient into said mixing zone, and liquid supply means including two tanks, the first tank adapted to contain liquid at ordinary temperatures and the second tank adapted to contain liquid at controlled temperatures, means also operable upon actuation of said external control to withdraw a quantity of liquid from said second tank sufficient to form a single drink and to supply simultaneously a like quantity of liquid at ordinary temperatures thereto, and means for simultaneously dispensing the liquid withdrawn from said second tank into said mixing zone to form a beverage, and withdrawing a like quantity of liquid from said first tank.

12. In a selective beverage vending machine, a cup stack magazine adapted to support a plurality of cup stacks, an outlet in said magazine, a cup dispenser located below said outlet adapted to receive a cup stack therethrough, a plurality of external controls, supply means for a plurality of beverage ingredients capable of being mixed with a liquid to form a beverage, motive means operable in response to actuation of an external control to dispense one or more beverage ingredients into a cup in accordance with the selected control, means driven by said motive means to dispense a cup from a cup stack in the cup dispenser, and normally inoperable mechanism adapted to become operable upon the depletion of a cup stack to deliver a succeeding cup stack to said cup dispenser.

13. In a selective beverage vending machine, a rotary cup stack magazine adapted to support a plurality of cup stacks, an outlet in said magazine, a cup dispenser located below said outlet adapted to receive a cup stack therethrough, a plurality of beverage ingredients, a plurality of external controls, motive means operable in response to actuation of an external control to cycle the machine and cause a beverage ingredient to be dispensed into a mixing zone, and other mechanism also operable by said motive means to rotate said cup stack magazine and deliver a succeeding cup stack to said cup dispenser when the preceding cup stack has been depleted.

14. The combination with a beverage vending machine, of a rotary cup stack magazine adapted to support a plurality of cup stacks, a cup dispenser adapted to receive successive cup stacks from said magazine and to dispense cups singly therefrom, electrical control means for cycling the machine and dispensing a beverage into a cup, cup stack delivery means normally inoperable but adapted to become operable upon the depletion of a cup stack in said cup dispenser, and means operable by said electrical control means to actuate said cup stack delivery means during each cycle of the machine, whereby a succeeding cup stack will be delivered to said cup dispenser after the preceding cup stack has been depleted.

15. The combination with a beverage vending machine, of a rotary cup stack magazine adapted to support a plurality of cup stacks, a cup dispenser adapted to receive successive cup stacks from said magazine and to dispense cups singly therefrom, electrical control means for cycling the machine and dispensing a beverage into a cup, cup stack delivery means including a ratchet wheel and a pawl, means for reciprocating said pawl during each cycle of the machine, means normally preventing engagement of said pawl with said ratchet wheel, and means for moving said last named means upon depletion of a cup stack in said cup dispenser to permit engagement of said pawl with said ratchet wheel, whereby said ratchet wheel and magazine will be rotated to deliver a succeeding cup stack to said cup dispenser. machine.

16. In a beverage vending machine, a rotary cup stack magazine adapted to support a plurality of cup stacks, an outlet in said magazine, a cup dispenser located below said outlet adapted to receive a cup stack therethrough, electrical control means operable to cycle the machine and cause a beverage to be dispensed into a cup, mechanism operable by said electrical control means to rotate said magazine and deliver a succeeding cup stack to said cup dispenser when the preceding cup stack has become depleted, and switch means controlled by said mechanism and operable upon depletion of the last cup stack in the magazine to prevent energization of said electrical control means and render the machine inoperative.

17. In a beverage vending machine, a rotatable carriage, cup receiving means at opposite sides of said carriage to receive a cup, means for rotating said carriage and cup through a partial revolution during each full cycle of the machine to a position where the cup with a beverage therein is available to a customer and means operable during the next succeeding cycle of the machine for removing a cup from the cup receiver utilized during the preceding cycle of the machine.

18. In a beverage vending machine, a rotatable carriage, cup receiving means at the front and rear ends thereof, means for dispensing a cup into the rear cup receiver, means for rotating said carriage through a one-half revolution during a full cycle of the machine, to thereby bring the cup with the beverage therein and its receiver to the front of the machine, and means operable during rotation of said carriage at the next cycling of the machine for removing a cup from the front cup receiver which may have been replaced therein.

19. In a beverage vending machine having a display panel, a plurality of external controls with indicia associated therewith and a cup compartment at the front of the machine, a display lamp for lighting the display panel, an indicating lamp for lighting the controls and indicia, a safety lamp to indicate the machine is cycling, a cup compartment lamp, and electrical control means operable when energized to light said lamps in a predetermined sequence during the cycling of the machine.

20. In a coin operated beverage vending machine having a display panel, a plurality of external controls with indicia associated therewith, and a cup compartment at the front of the machine, an electric circuit normally energized during periods when the machine is not operating, a display lamp and a cup compartment lamp in said circuit to thereby normally illuminate said display panel and said cup compartment, a second electric circuit having an indicating lamp therein, means operable upon depositing an acceptable coin to de-energize the first circuit and energize said second circuit to thereby illuminate the external controls and indicia, a third electric circuit having a safety lamp therein to indicate the machine is cycling, and means operable upon actuation of any external control to cycle the machine and energize said third circuit to illuminate said safety lamp and to de-energize said second circuit.

21. In a coin operated beverage vending machine having a display panel, a plurality of external controls with indicia associated therewith, and a cup compartment at the front thereof, an electric circuit normally energized during periods when the machine is not in operation, a display lamp and a cup compartment lamp connected in parallel in said circuit to thereby normally illuminate said display panel and cup compartment, a second electric circuit having an indicating lamp therein, means operable upon depositing an acceptable coin to de-energize the first circuit and to energize said second circuit to thereby illuminate the external controls and indicia, electrical control means operable in response to actuation of any external control to cycle the machine, a safety lamp to indicate the machine is cycling, means also responsive to actuation of the same external control to de-energize said second circuit and to illuminate said safety lamp, and means operable at the end of the machine cycle to de-energize all circuits and to energize the first circuit, whereby said display lamp and cup compartment lamp will again be illuminated.

22. A coin controlled selective beverage vending machine, comprising a plurality of containers each adapted to contain a quantity of at least one finely divided solid beverage ingredient, a mixing zone, a plurality of extrnal controls, a normally energized electric circuit and a normally de-energized electric circuit, switch means operable upon depositing an acceptable coin to de-energize the first named circuit and to energize the second named circuit to thereby prepare the machine for cycling, selector means, an electric circuit associated with each external control, some of said last named circuits also being connected with said selector means, and motive means operable in response to the actuation of a selected external control to actuate said motive means and said selector means, to thereby cycle the machine and cause selected beverage ingredients to be dispensed into said mixing zone.

23. In a selective beverage vending machine, a plurality of finely divided solid beverage ingredients capable of being mixed with a liquid to form a beverage, a mixing zone, a plurality of dispensing means for dispensing said ingredients into said mixing zone, selector means operable to actuate at least one of said last named means during a single cycle of the machine to thereby dispense at least one of said ingredients into said mixing zone, means for depositing a liquid into said mixing zone for admixture with the ingredient to thereby form a beverage, and means to prevent caking of said solid beverage ingredients prior to dispensing into the mixing zone.

24. In a selective beverage vending machine, a plurality of containers each adapted to contain a quantity of at least one beverage ingredient in finely divided solid form, a mixing zone, a plurality of external controls, electric selective means operable in response to actuation of a selected control to dispense at least one of said beverage ingredients into said mixing zone, means to deposit a liquid into said mixing zone to thereby form a beverage, and means associated with each of said containers to prevent caking of the solid beverage ingredient therein.

25. In a beverage vending machine, a plurality of supply means for beverage ingredients, a mixing zone, means for causing relative movement between said supply means and said mixing zone continuously during a single cycle of the machine, a plurality of external controls, electrically operated selector means operable upon actuation of a selected control for dispensing a selected beverage ingredient into said mixing zone during said movement, and means for depositing a liquid into said mixing zone to thereby form a beverage.

26. In a beverage vending machine, a plurality of supply means for beverage ingredients, a mixing zone, means for causing relative movement between said supply means and said mixing zone to successive positions adjacent each other, a plurality of external controls, electrically operated selector means operable upon actuation of a selected control for dispensing a selected beverage ingredient into said mixing zone during relative movement of said mixing zone with respect to the selected supply means, and means for depositing a liquid into said mixing zone to thereby form a beverage.

27. In a beverage vending machine, a plurality of supply means for beverage ingredients, a mixing zone, means for causing relative movement between said supply means and said zone to successive positions adjacent each other, a plurality of external controls, electrically operated selector means operable upon actuation of a selected control for dispensing one or more selected beverage ingredients into said mixing zone during relative movement thereof with respect to the supply means for selected ingredients, and means for depositing a liquid into said mixing zone to thereby form a beverage.

28. In a beverage vending machine, a plurality of containers each adapted to contain a quantity of at least one beverage ingredient in finely divided solid form, a mixing zone, means for causing relative movement between said supply means and said zone to successive positions adjacent each other, a plurality of external controls, electrically operated selector means operable upon actuation of some of said external controls to dispense beverage ingredients from a plurality of said containers into said mixing zone, and means for depositing a liquid into said mixing zone for forming a beverage.

References Cited in the file of this patent

UNITED STATES PATENTS

| Number | Name | Date |
|---|---|---|
| 366,070 | Bond | July 5, 1887 |
| 449,024 | Allin | Mar. 24, 1891 |
| 1,180,344 | Valentine | Apr. 25, 1916 |
| 1,520,560 | Burno | Dec. 23, 1924 |
| 1,680,238 | Baker | Aug. 7, 1928 |
| 1,732,599 | Hardesty | Oct. 22, 1929 |
| 1,882,812 | Gunn | Oct. 18, 1932 |
| 1,895,745 | Asenbaum | Jan. 31, 1933 |
| 2,019,016 | McLellan | Oct. 29, 1935 |
| 2,387,871 | Baumann | Oct. 30, 1945 |
| 2,391,003 | Bowman | Dec. 18, 1945 |
| 2,433,054 | Lime | Dec. 23, 1947 |
| 2,462,019 | Bowman | Feb. 15, 1949 |
| 2,558,522 | Knopp | June 26, 1951 |

FOREIGN PATENTS

| Number | Country | Date |
|---|---|---|
| 11,965 | Australia | Mar. 28, 1933 |